INVENTORS
ALOIS CHRASTIL
ROGER W. FERGUSON
KENNETH R. WILLIAMS
BY
Lester W. Clark
ATTORNEY

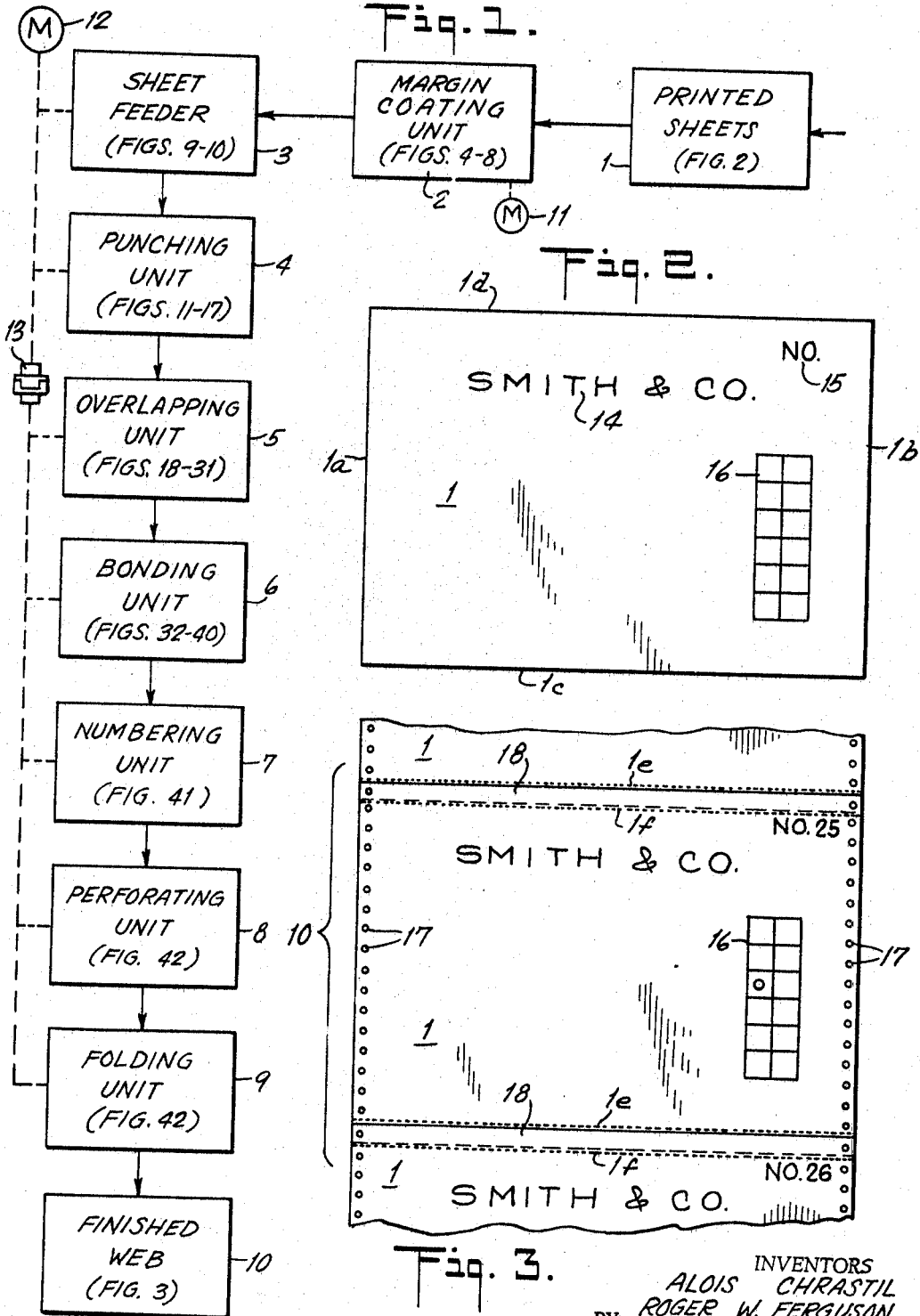

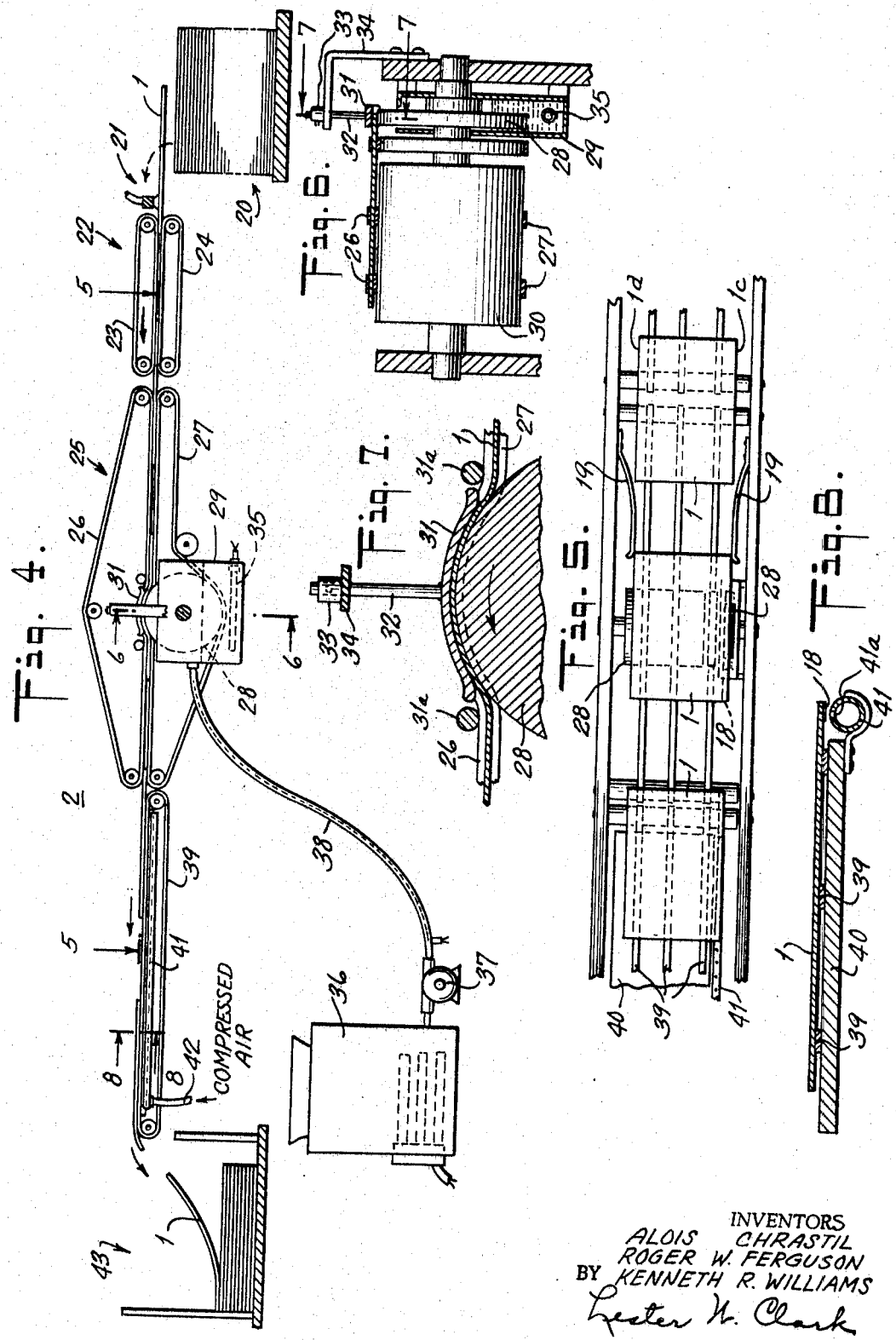

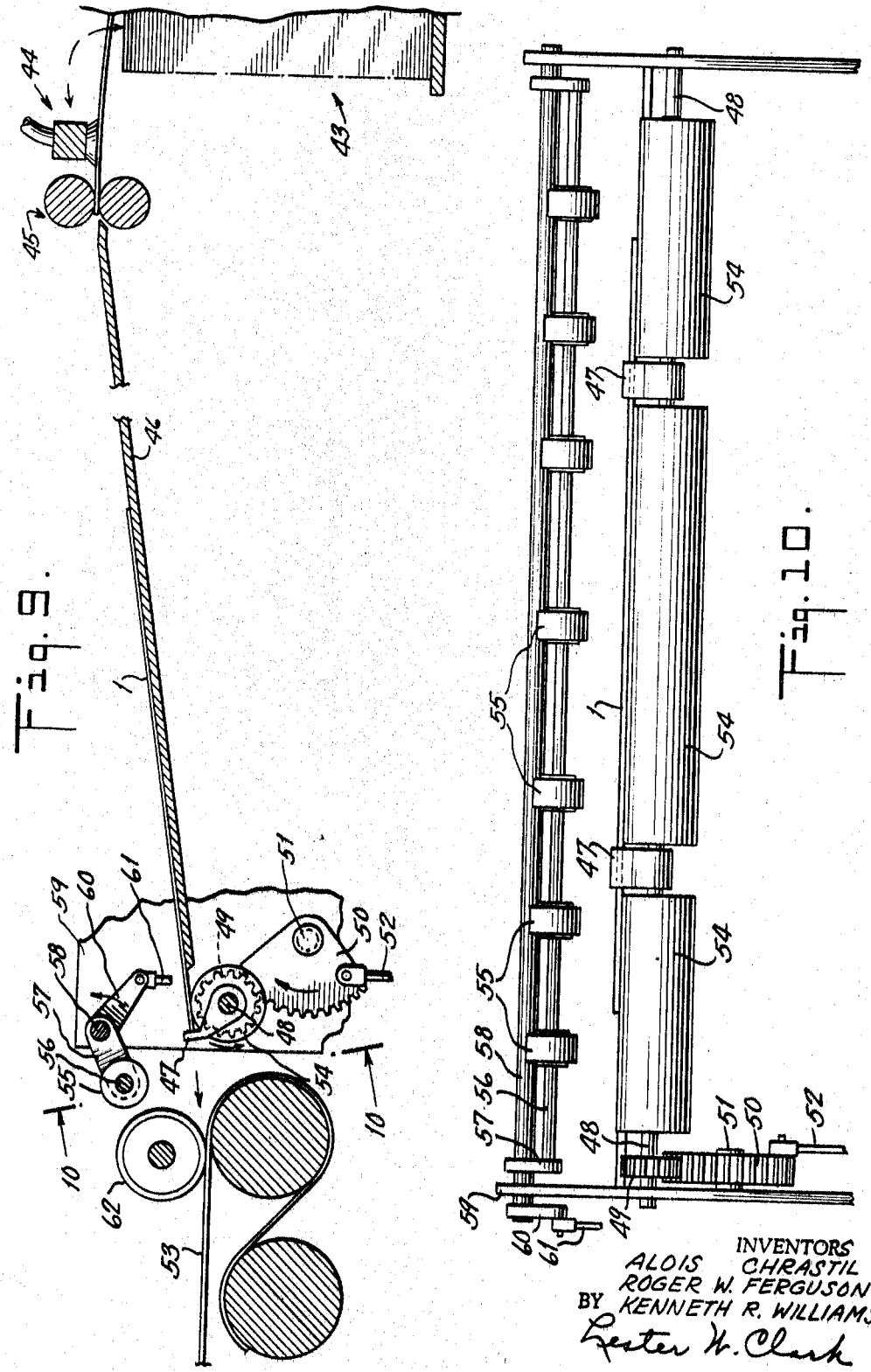

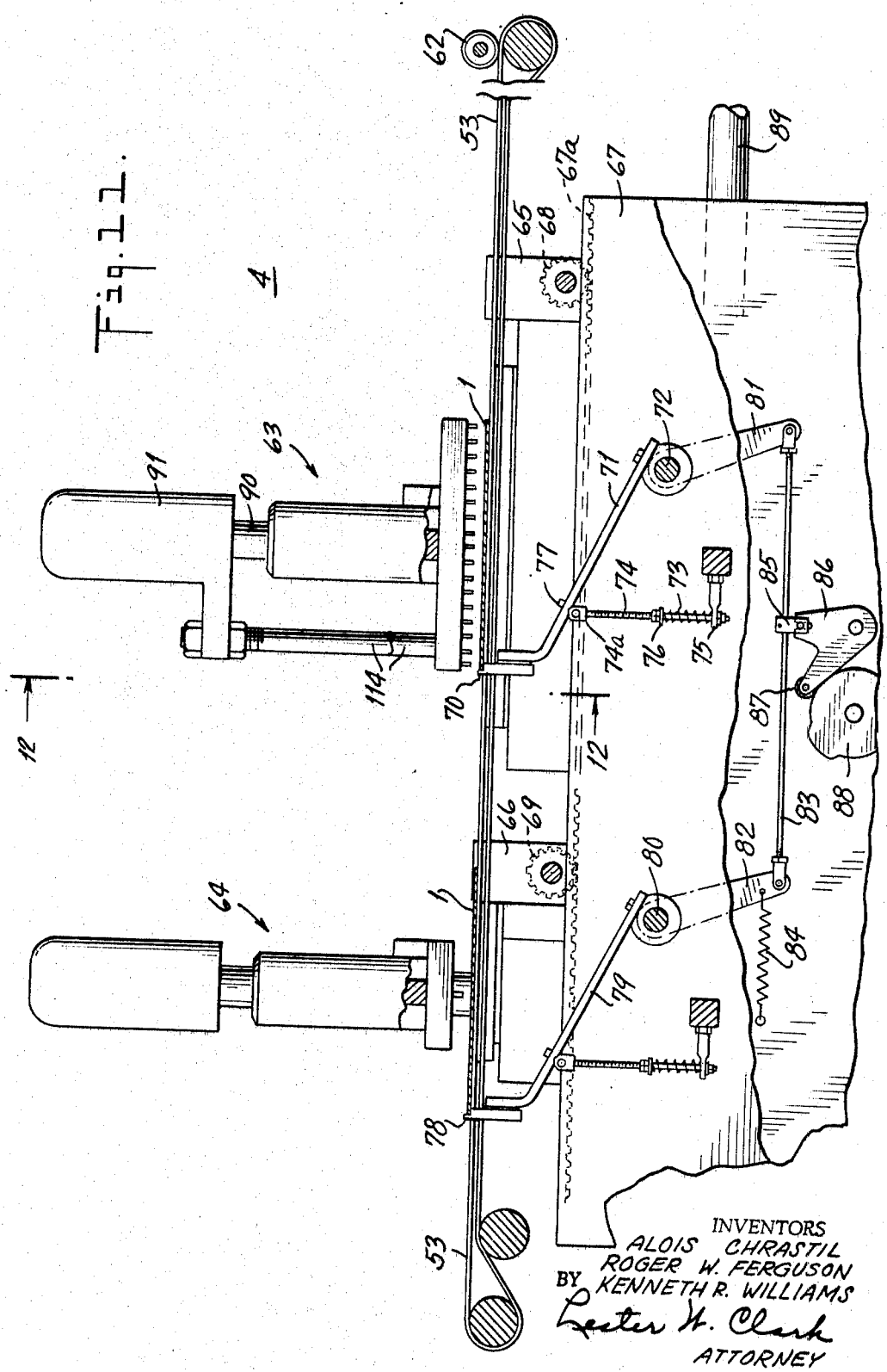

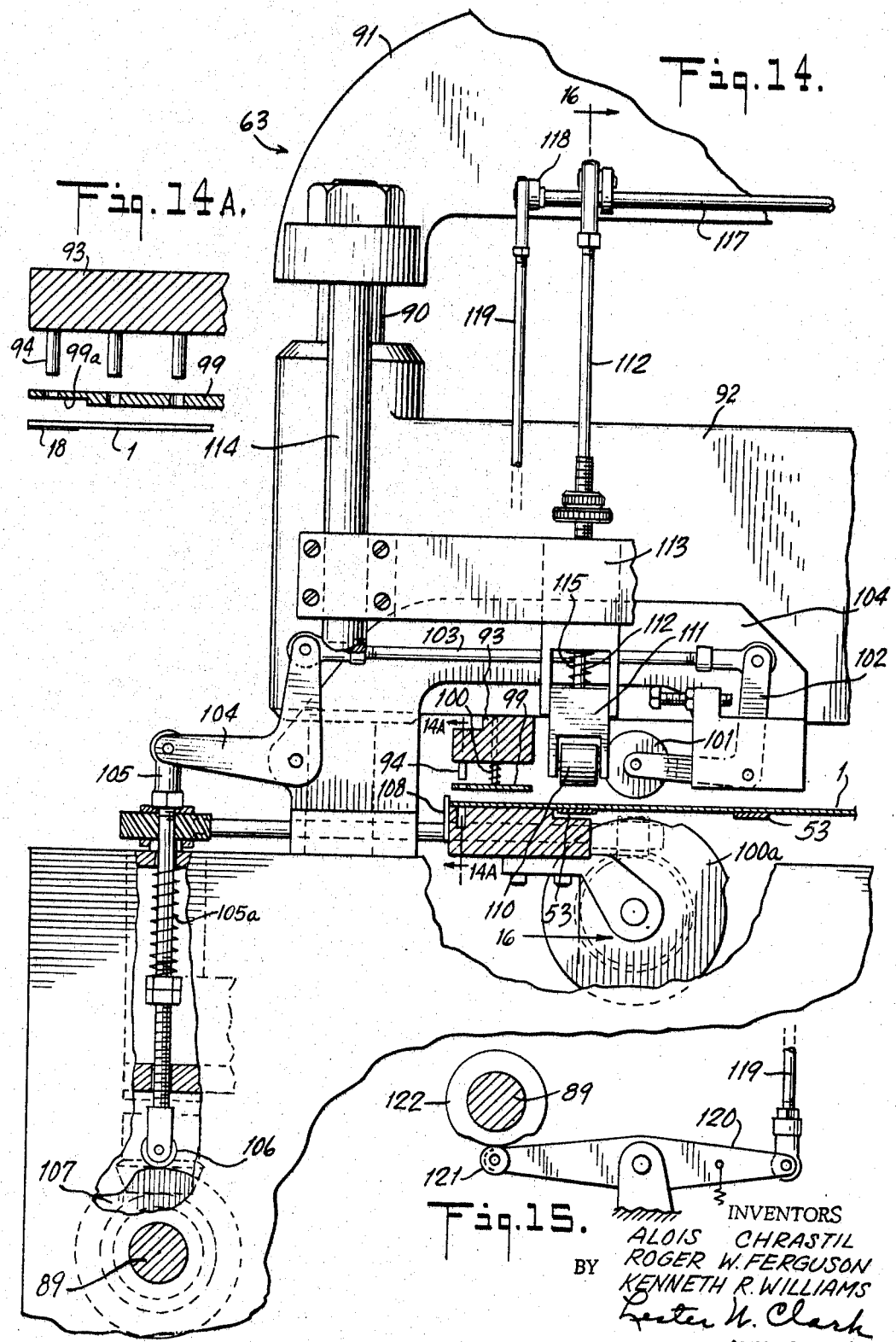

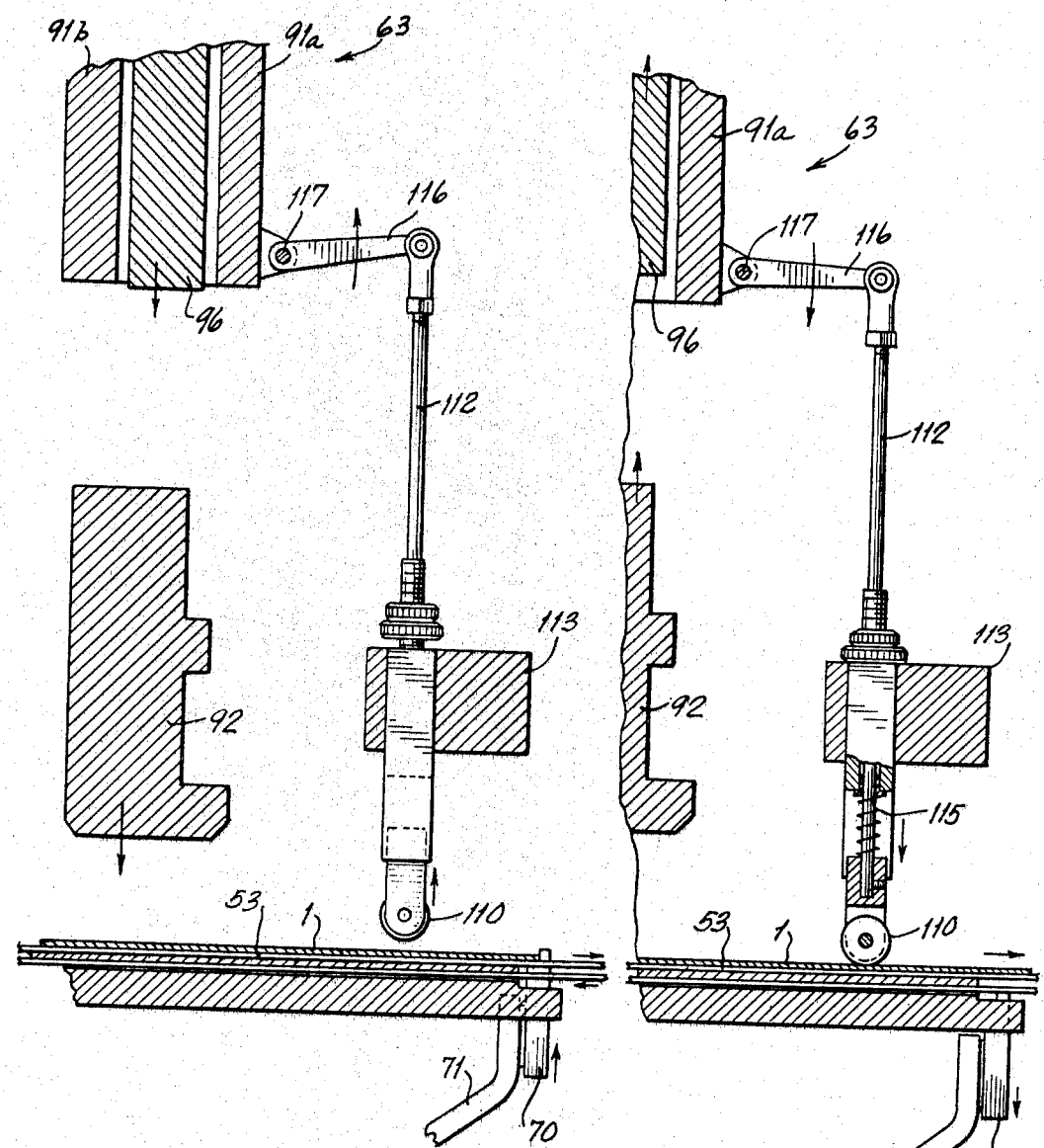

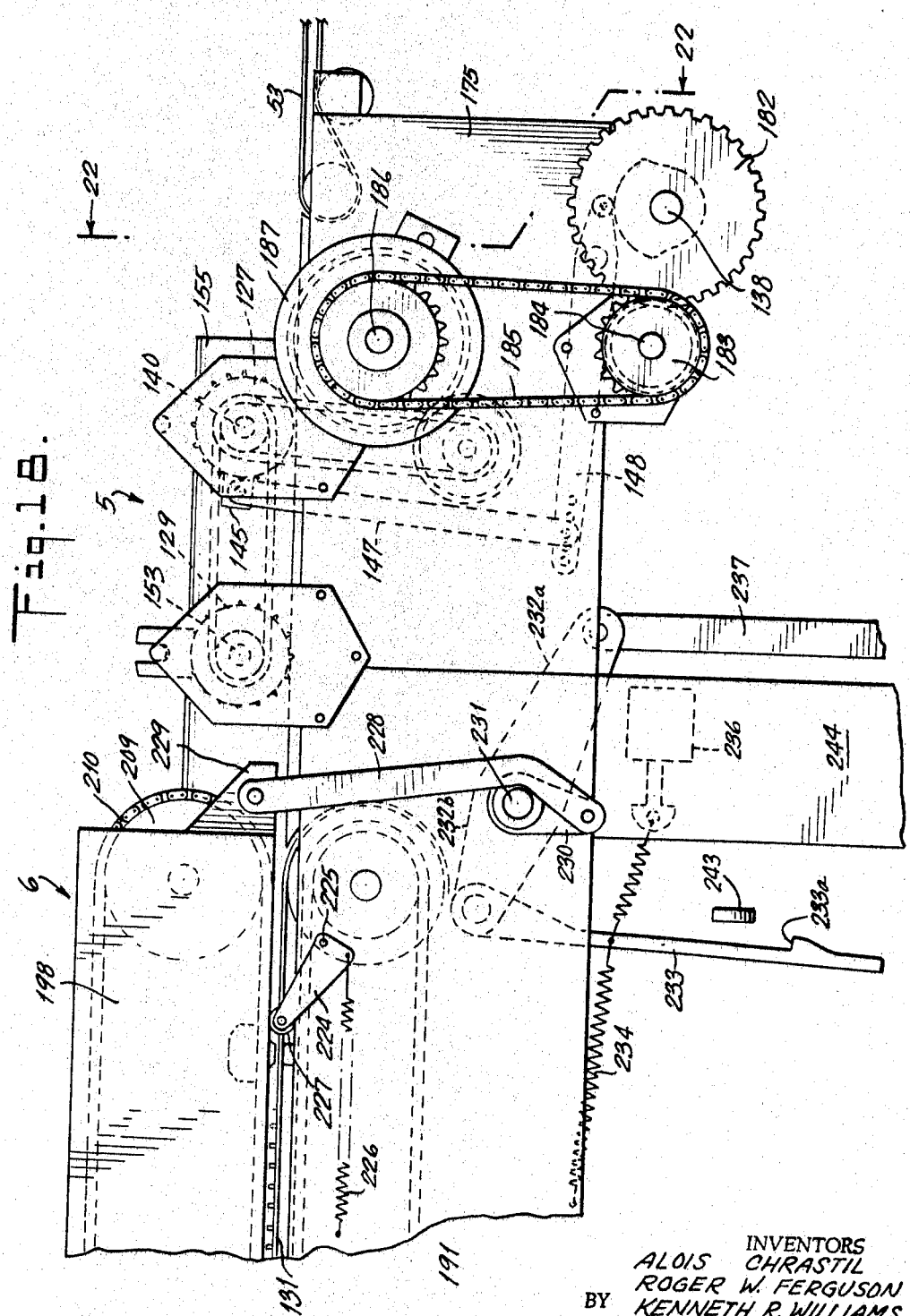

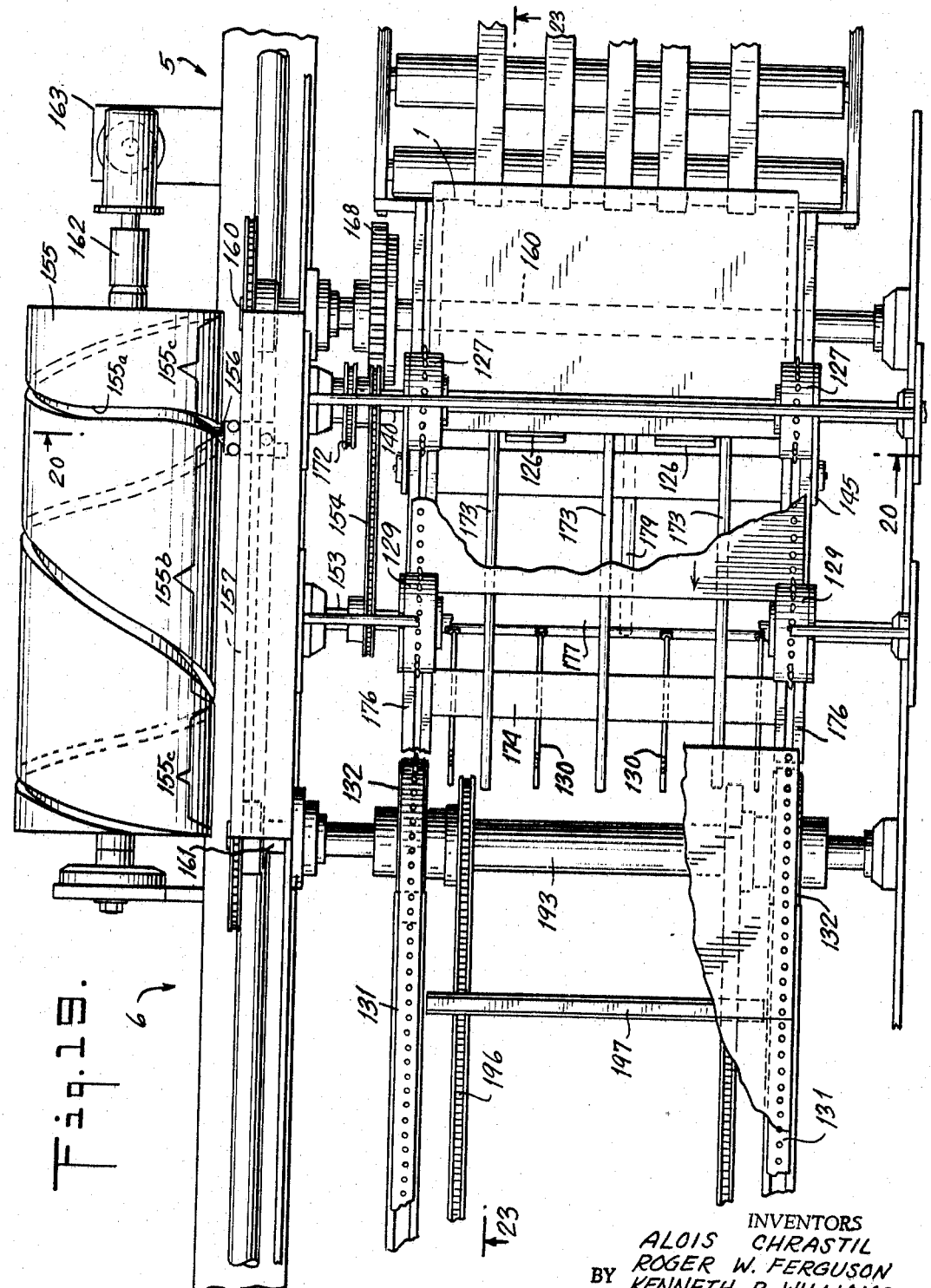

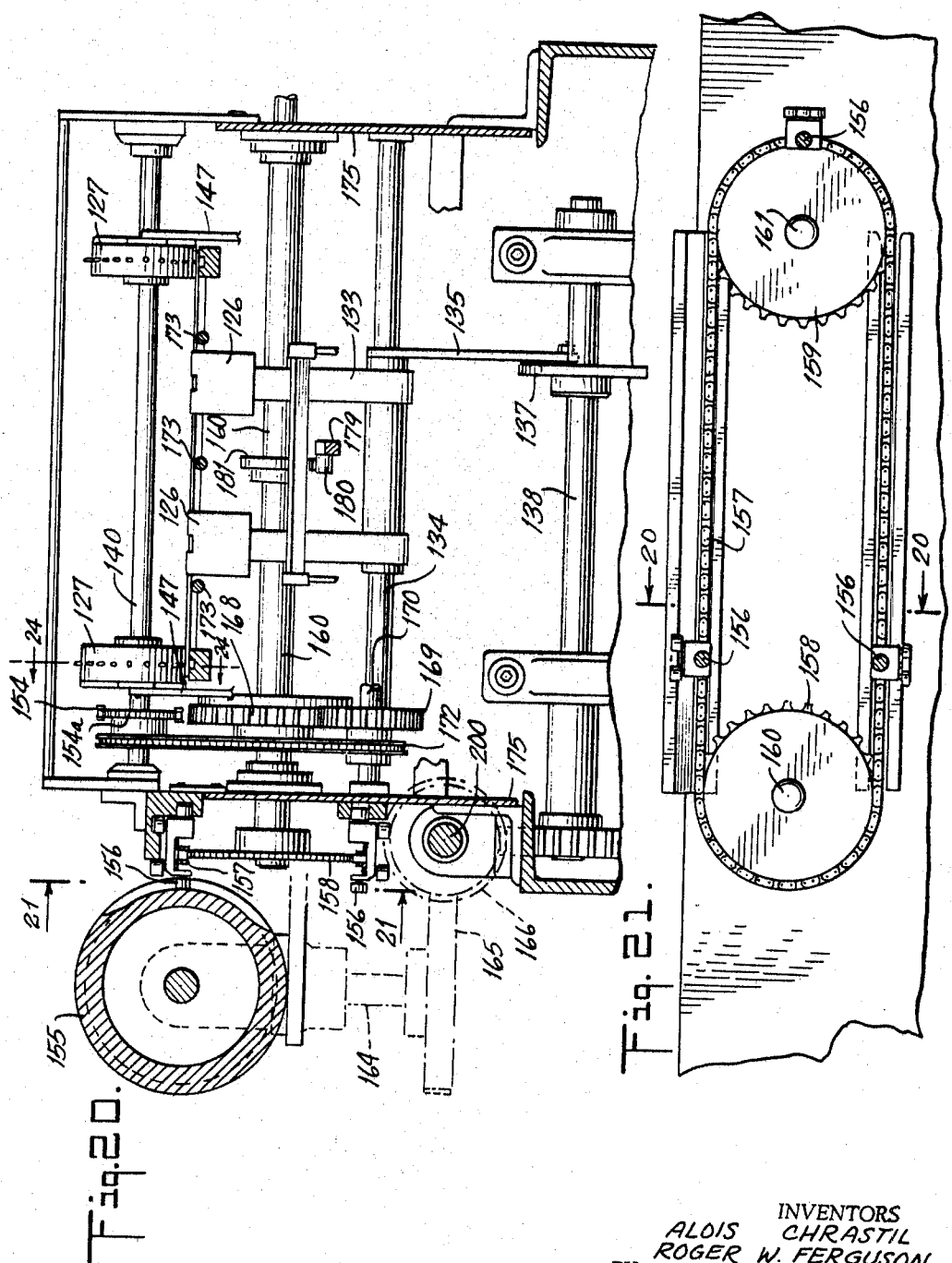

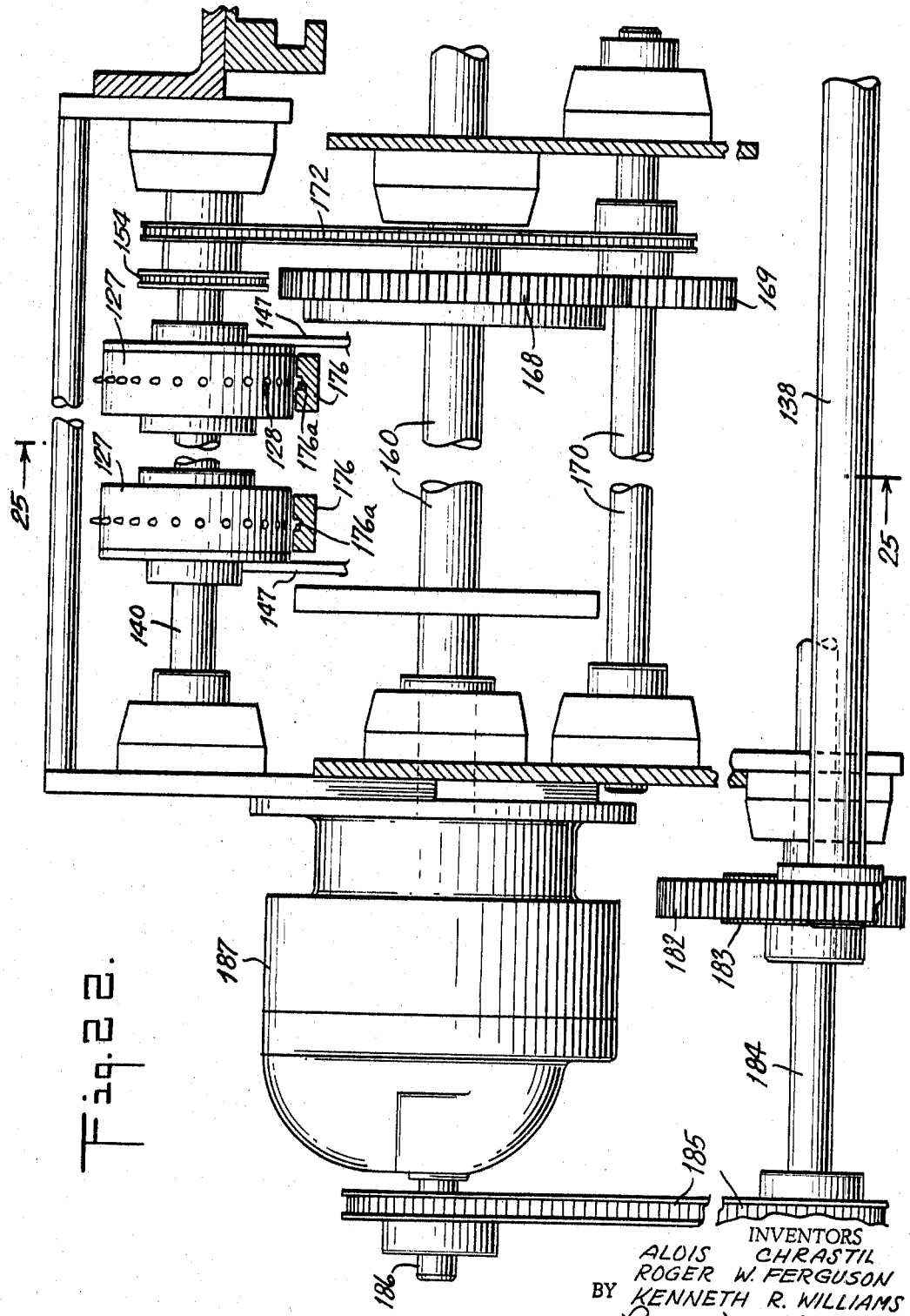

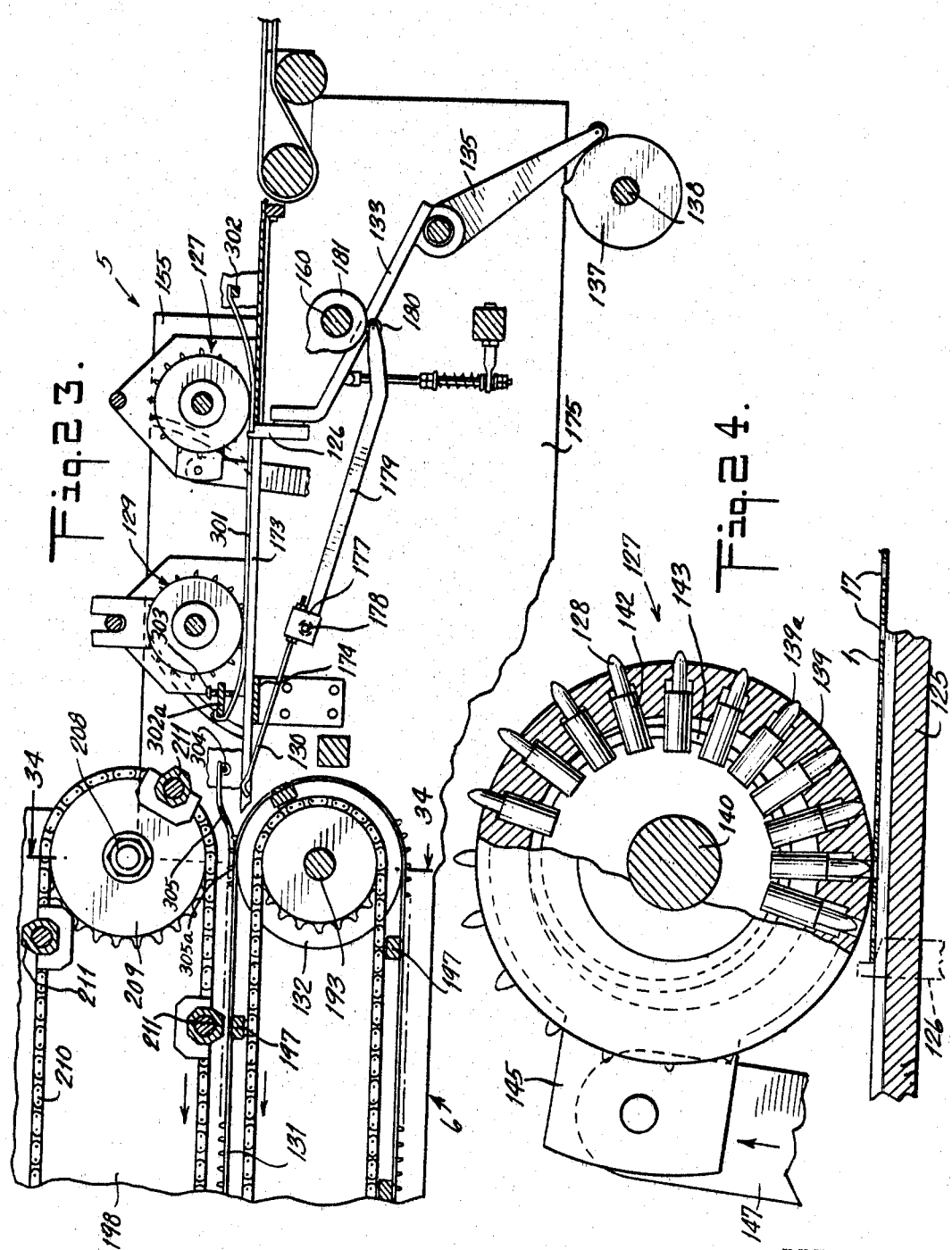

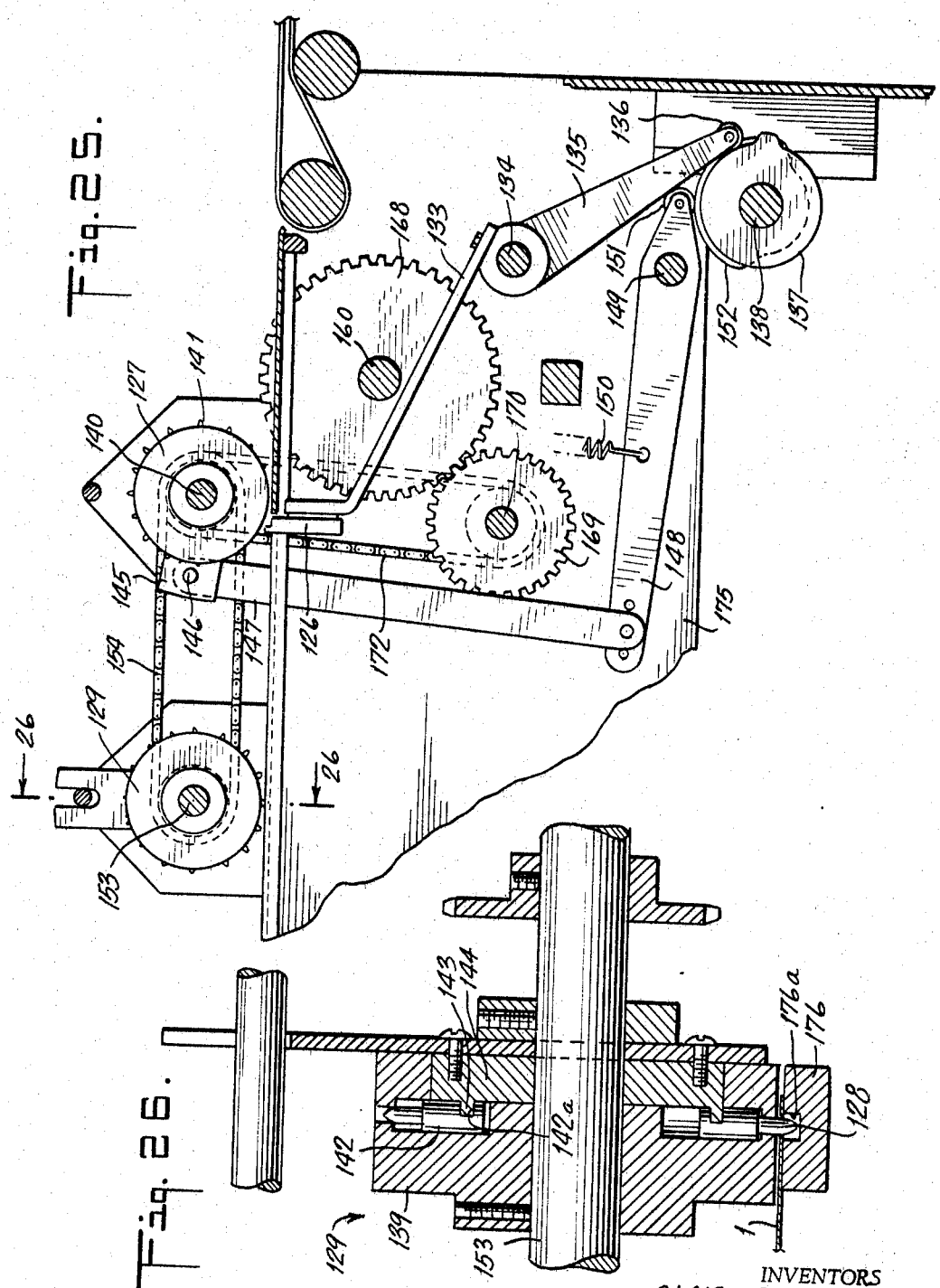

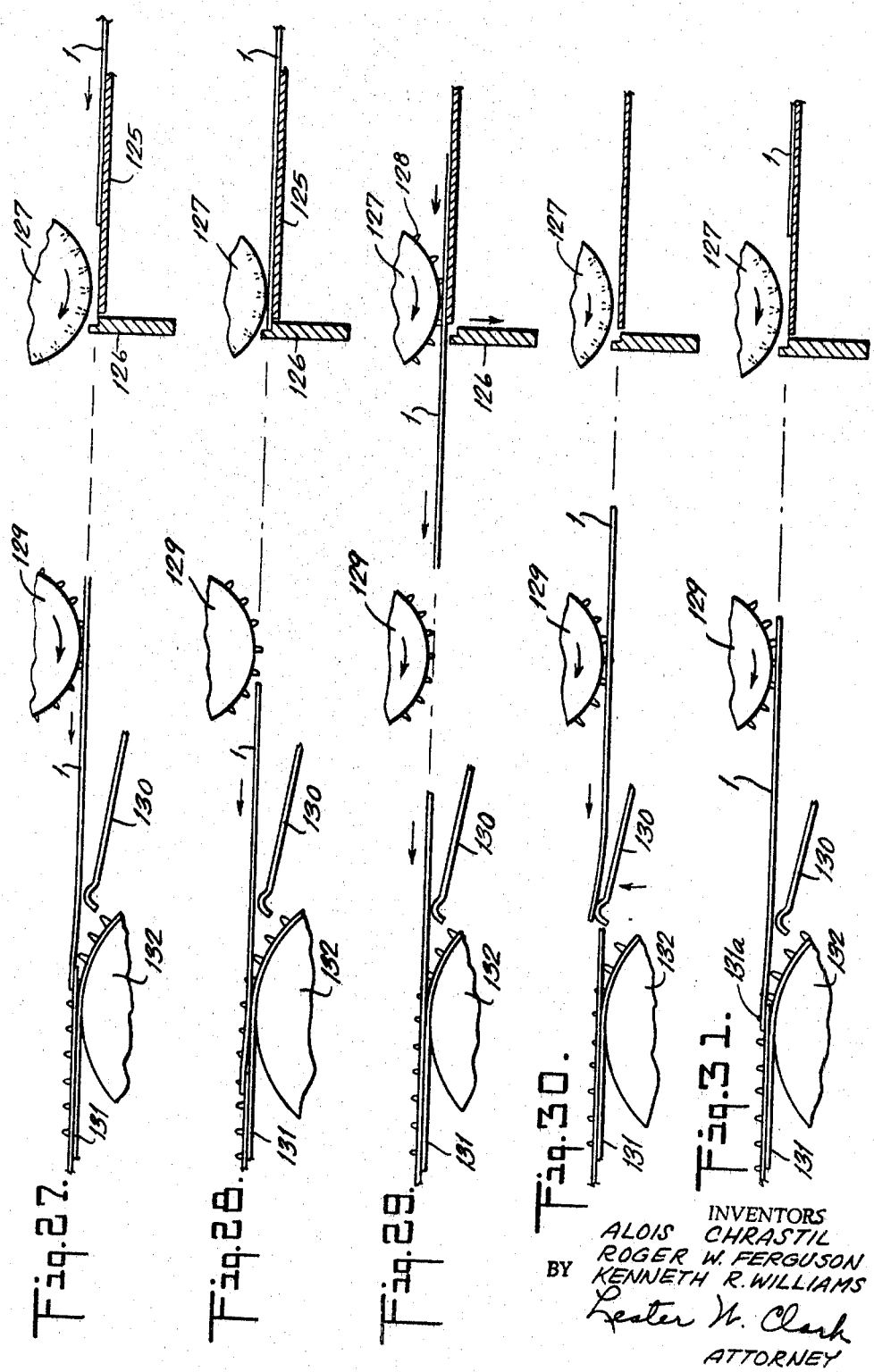

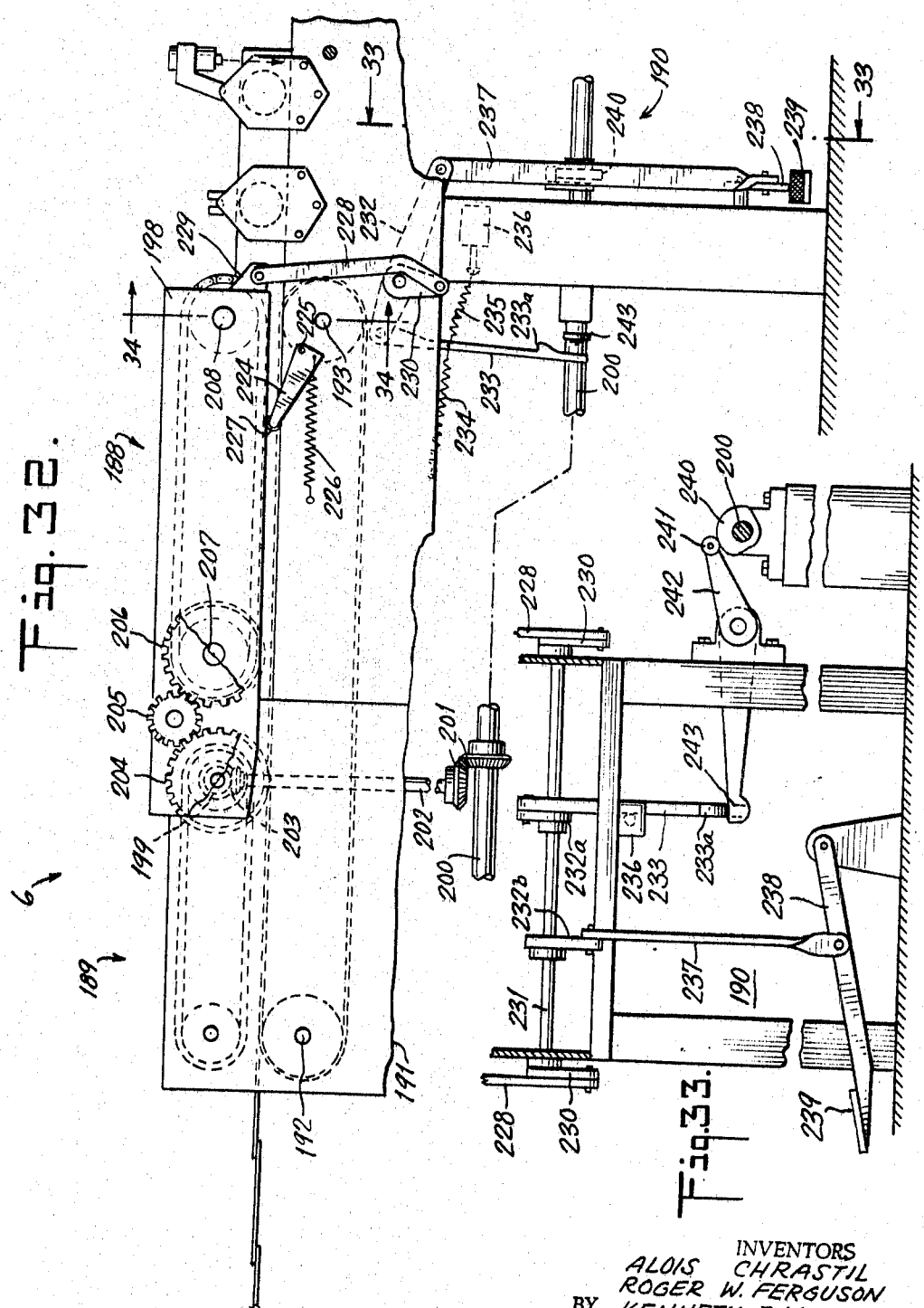

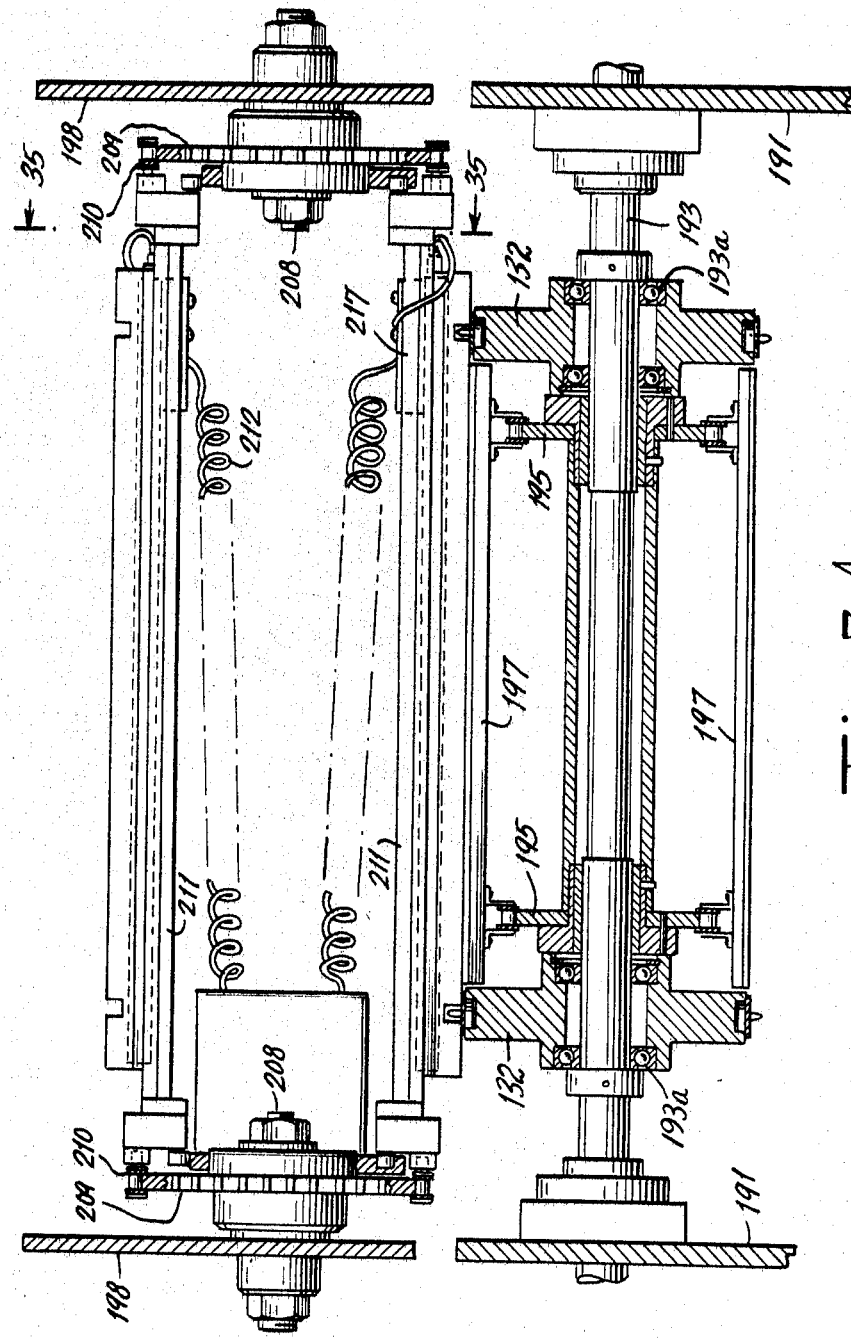

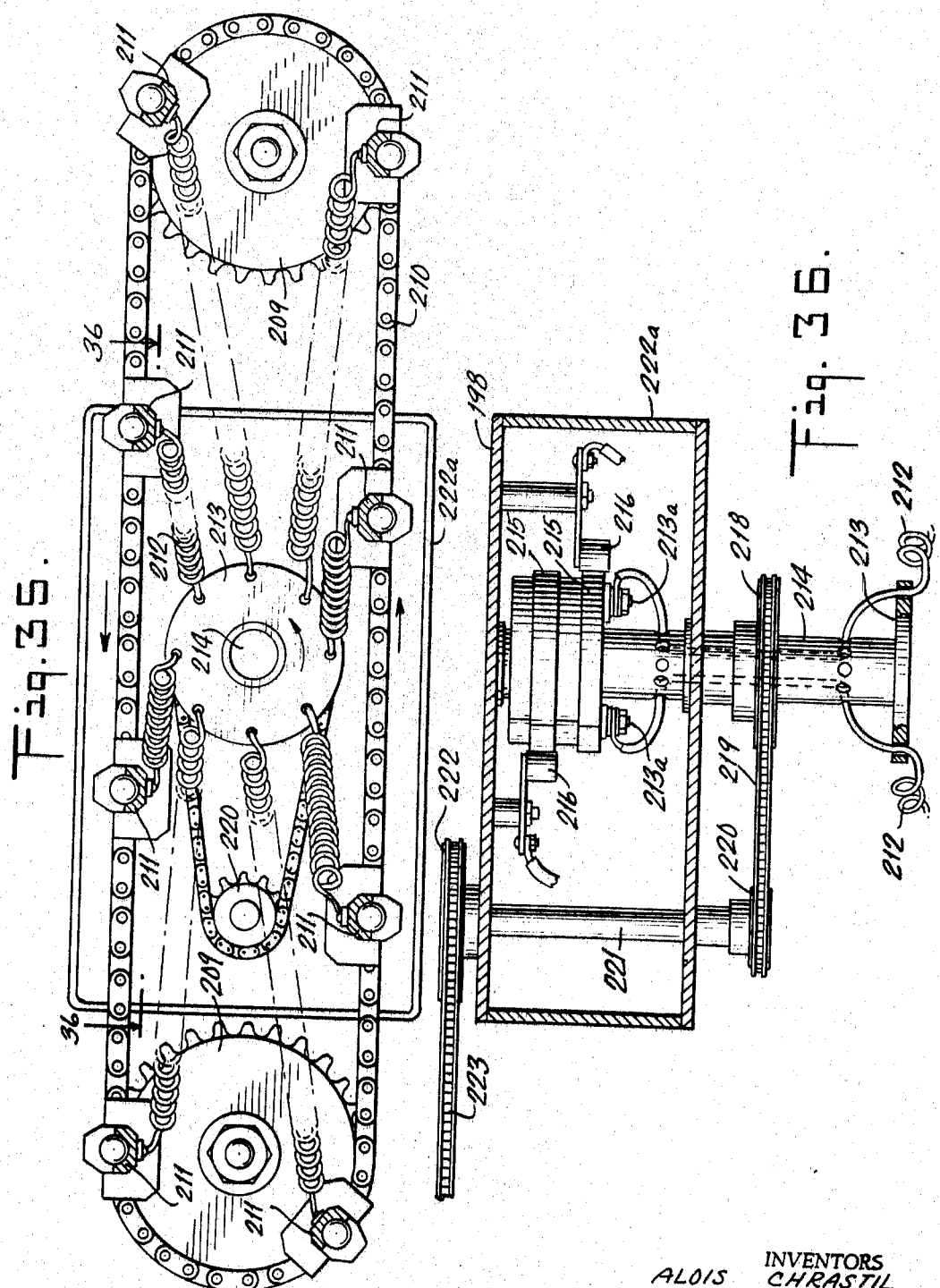

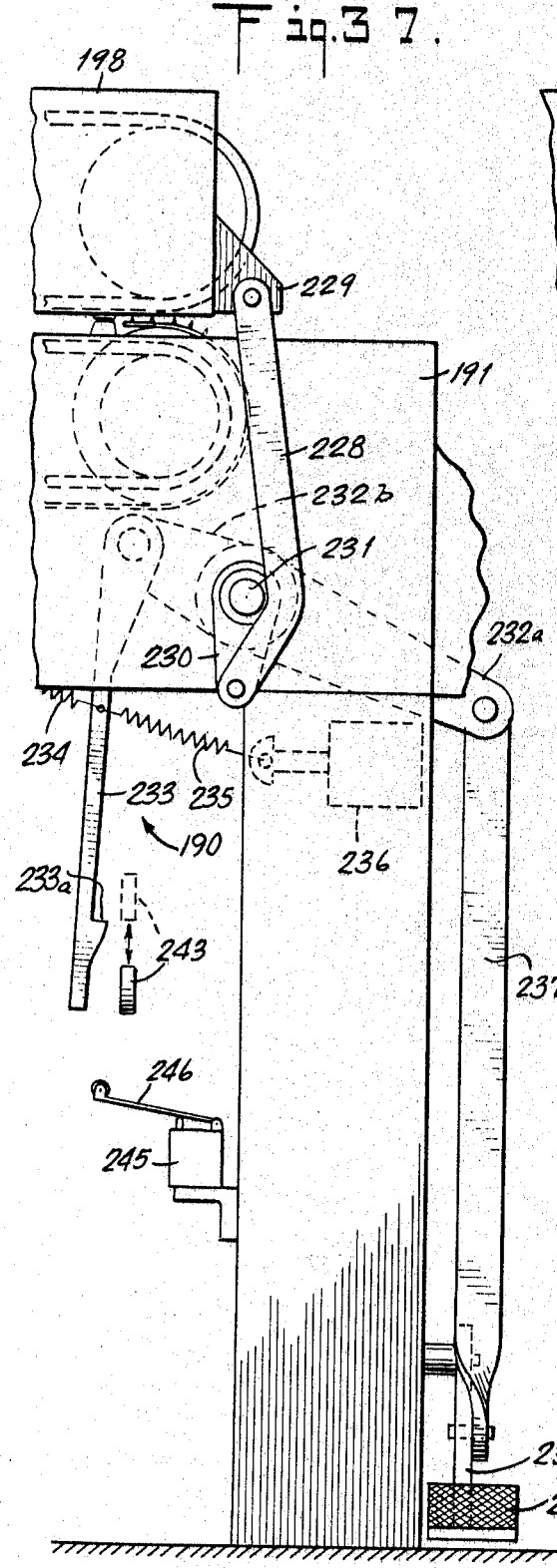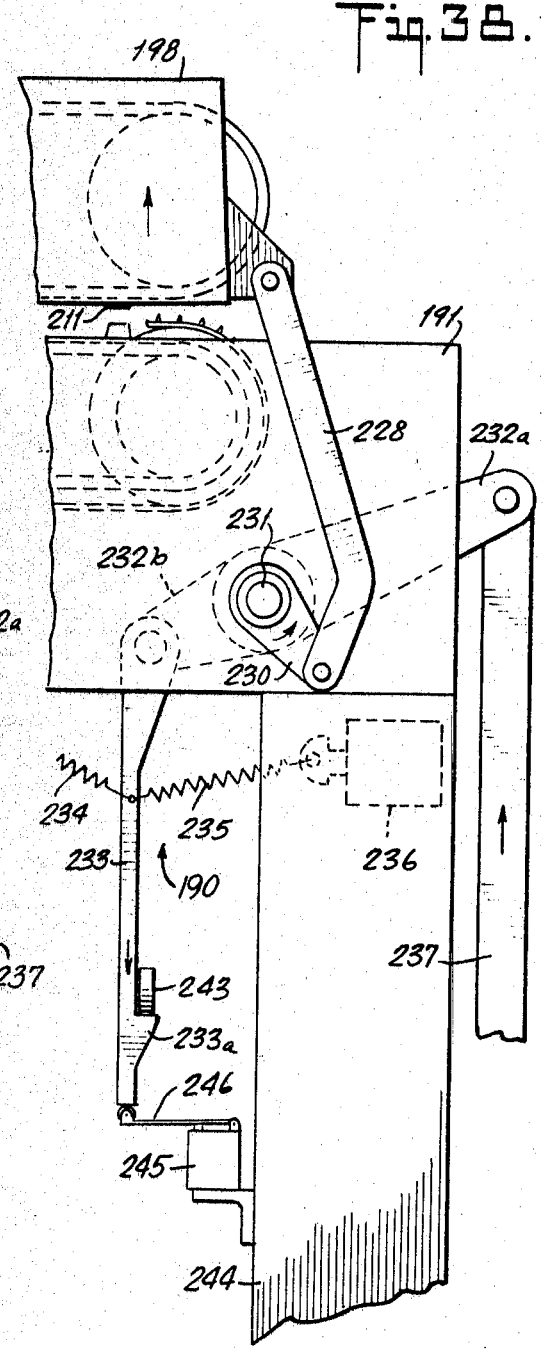

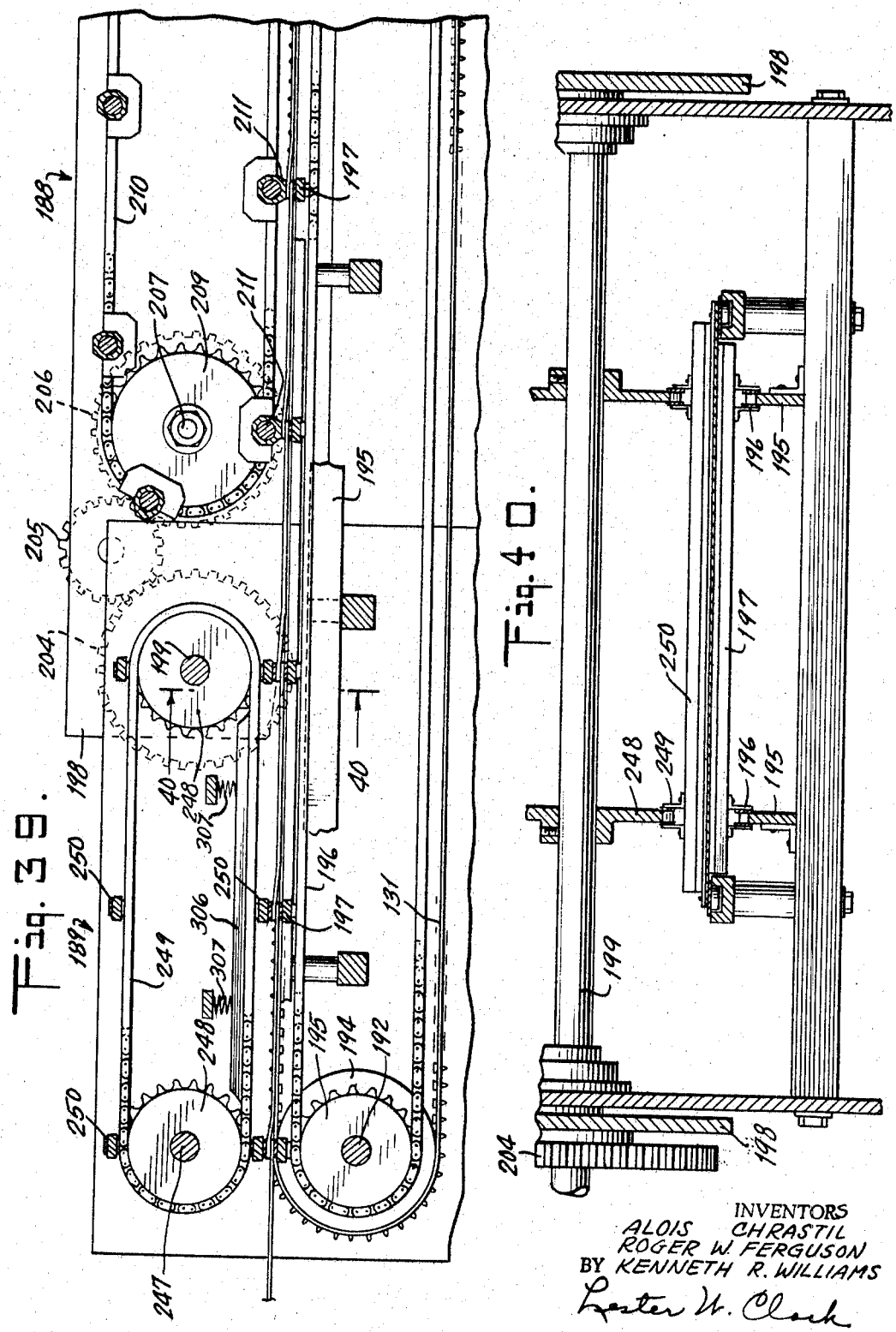

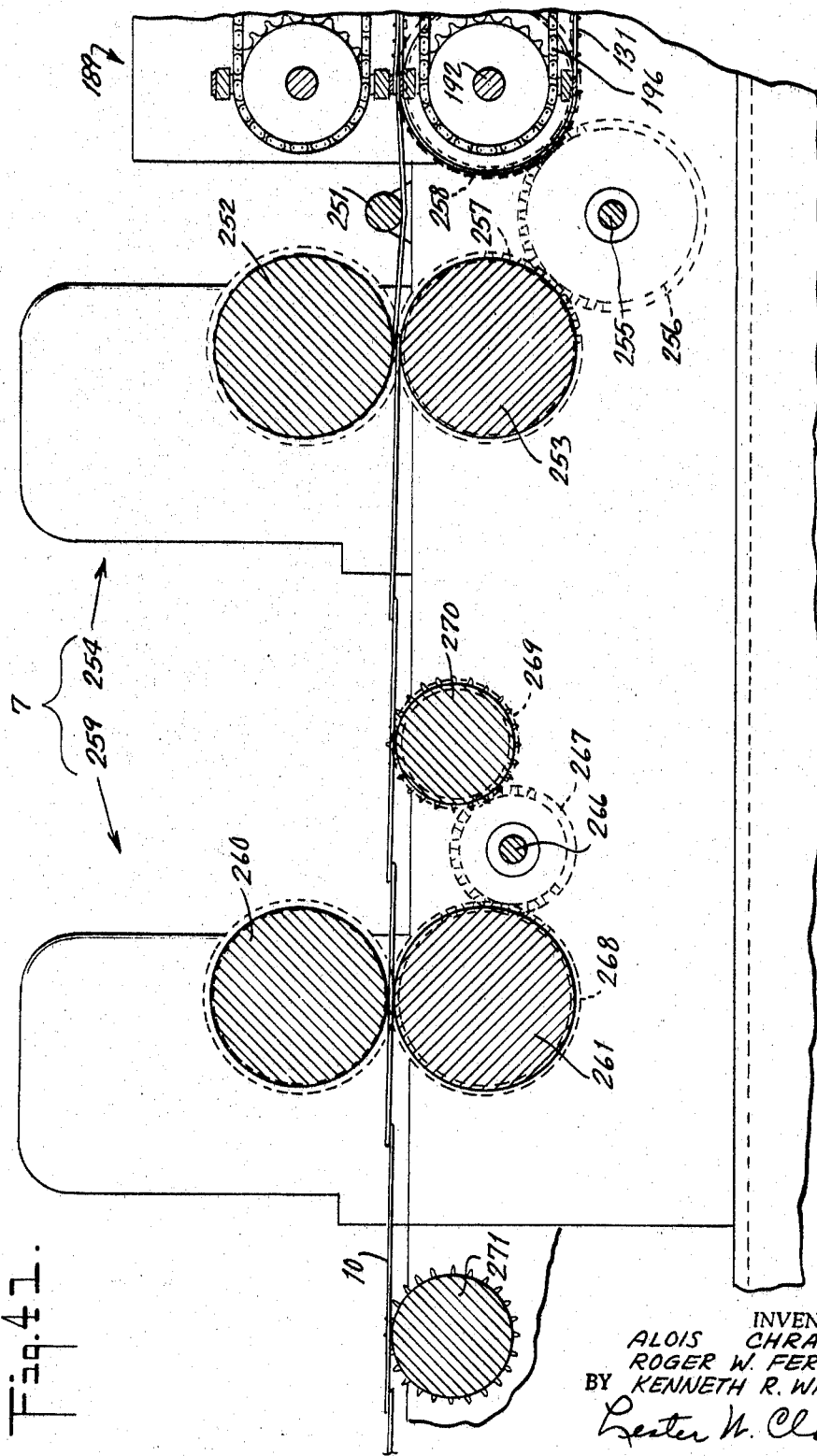

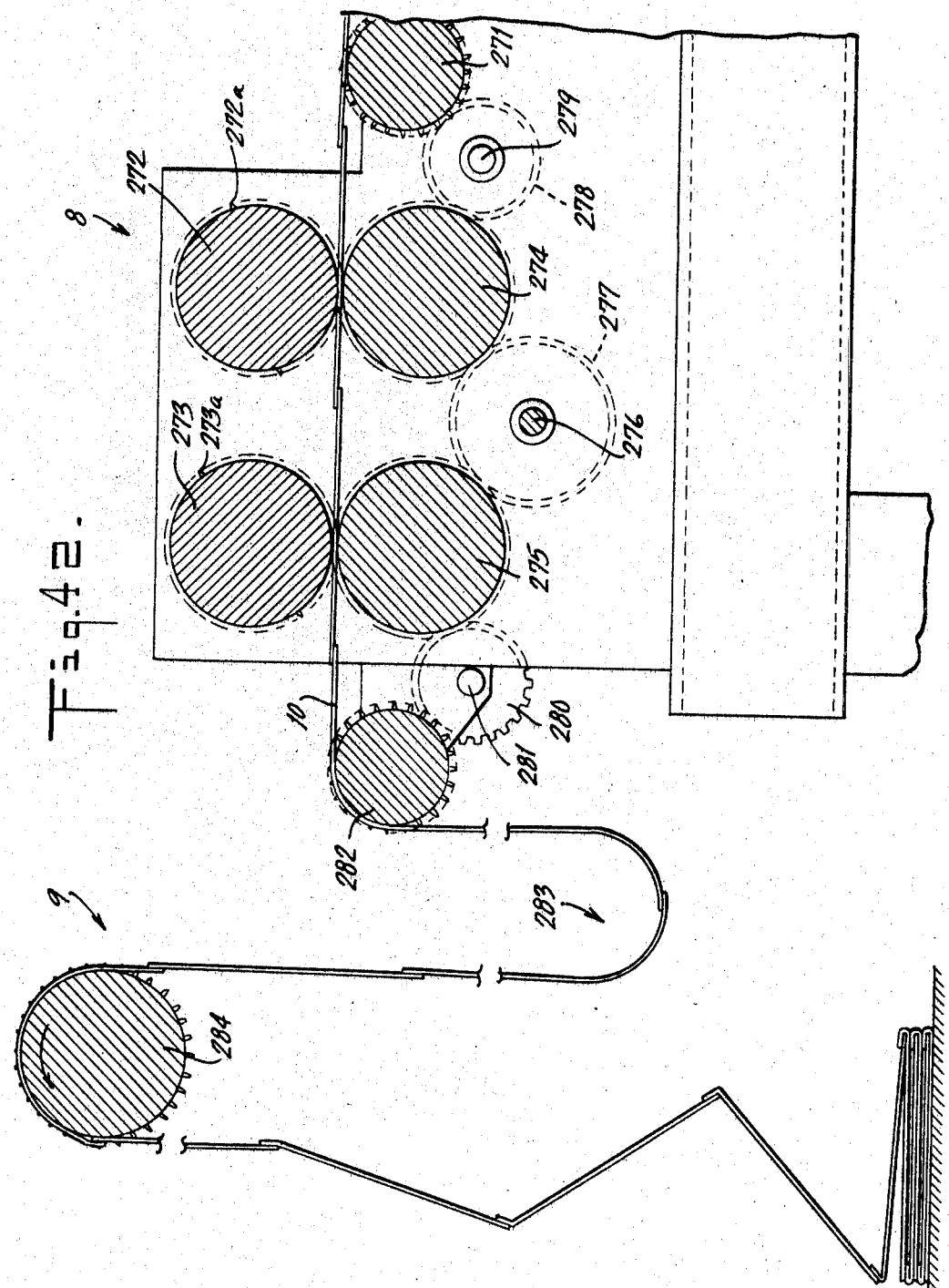

United States Patent Office 3,484,323
Patented Dec. 16, 1969

3,484,323
CONTINUOUS FORMS AND METHOD AND APPARATUS FOR MAKING SAME
Alois Chrastil, Yonkers, and Roger W. Ferguson and Kenneth R. Williams, Mount Vernon, N.Y., assignors to American Bank Note Company, New York, N.Y., a corporation of New York
Filed Nov. 14, 1963, Ser. No. 323,691
Int. Cl. B65h 37/04; B32b 29/00
U.S. Cl. 156—513                    12 Claims

ABSTRACT OF THE DISCLOSURE

A continuous form is prepared from separate sheets by a technique, and apparatus embodying the technique, according to which the sheets, each having two longitudinal edges and two transverse edges, have rows of spaced holes punched along their longitudinal margins, and a coating of activatable bonding material is applied along one transverse margin on one surface of each sheet. The marginally coated sheets are then advanced edgewise successively in a direction parallel to their longitudinal edges and overtapping means are provided including means for continuously moving the sheets forwardly and for accelerating each sheet until the transverse leading margin thereof overlaps the transverse trailing margin of the preceding sheet. Thereafter, during continuous movement of the overlapped sheets, the coating of bonding material is activated while the overlapping margins are pressed into firm engagement, thereby to bond the sheets together into a continuous web.

By reason of the rows of spaced holes along the longitudinal margins, which are located accurately with respect to the edges and, therefore, with respect to the printing that is initially provided on the sheets, the subsequent numbering of the sheets can be closely registered with the original printed matter.

---

This invention relates to continuous forms and to a method and apparatus for making such forms. The invention has particular utility in connection with continuous forms including consecutively numbered documents of value, e.g., stock certificates and bonds, although certain features of the invention have a broader utility in connection with other continuous forms.

It is becoming common to use continuous forms in the various kinds of business machines, including typewriters, addressing machines, accounting machines and computers. It is particularly desirable to use such forms where a considerable volume of paper work is required on the same types of forms, and it is even more desirable where the forms in question are consecutively numbered.

It has previously not been practical to prepare documents of value, such as stock certificates and bonds, as continuous forms. Such documents must be prepared with a view to making the counterfeiting of the documents difficult if not impossible. For that purpose, the documents must be printed on paper of good quality. An intricate pattern may be employed for a background printing, usually referred to as a tint. Another intricate pattern is commonly employed for the frame of the certificate. The body of the stock certificate commonly includes a small vignette, usually an engraving of a human figure. In order to make the printing of the highest quality, such documents are usually printed by the intaglio process, and are heavily inked. Successive printings with close registry between the printings are required, both for good appearance and for prevention of counterfeiting. Because of the heavy inking, a considerable time must be taken to dry the successive printings between impressions. Furthermore, the printing process must be one adaptable to an accurate accounting of each impression. In other words, copies of the documents must not be allowed to stray to unauthorized persons.

Continuous forms are commonly printed on a continuous strip or web. Since the web moves at a high speed, a light printing of fast drying ink is commonly used.

It has heretofore been considered impractical to print documents of value as continuous forms, principally because of the ink drying and registry problems.

It has been proposed to print documents of value conventionally and to mount the conventionally printed documents on a continuous carrier. While this arrangement has been commercially used, it presents difficult problems both to the printer and to the user. The carrier strip on which the forms are mounted must necessarily be wasted, which adds to the expense of the operation. Furthermore, there is always a possibility of loss of one of the documents in the operation of separating it from the carrier. In other words, a document may become entangled with the carrier and thrown into the waste with it.

The problem of consecutive numbering also presents difficulties with respect to the manufacture of documents of value in continuous forms. Any such documents which are misnumbered or damaged in printing must be accounted for. Furthermore, it is desirable to be able to correct manually any such damage or misnumbering. In other words, where stock certificates are conventionally printed, it is easy to remove from a finished stack of such certificates any which are misnumbered or otherwise damaged and to replace them with manually numbered and correctly printed certificates located in the proper order with respect to the rest of the stack.

An object of the present invention is to provide a continuous form prepared from separate sheets without the use of a supporting carrier. A further object is to provide such a continuous form in which the separate sheets are documents of value.

A further object is to provide a continuous form of the type described in which the separate sheets are consecutively numbered.

Another object is to provide an improved method for making a continuous form of the type described.

A further object is to provide such a form and a method of making it which are adaptable to correction by removal of damaged or misnumbered forms from the continuous web, and replacement thereof by corrected forms. For that purpose, a more specific object is to provide a continuous form in which successive sheets are bonded together by a heat sensitive bonding material so that a particular form may be released from the web by applying heat to the bonded joint.

A further object is to provide a web of continuous forms of the type described, in which the margins of successive forms are overlapped and bonded together, and in which the forms are punched along their longitudinal edges for convenient handling by conventional business machines.

Another object is to provide an improved web of continuous forms and a method of making the same in which the forms are consecutively numbered in registry with the printing on the forms after the web is completed.

Another object is to provide a method of making such forms which may be carried out either by suitable apparatus or by hand.

Another object is to provide improved apparatus for making continuous forms from separate sheets.

A further object is to provide improved apparatus for marginally coating separate sheets. Another object is to provide improved apparatus for punching in separate sheets, holes located accurately with respect to the edges of the sheets.

Another object is to provide continuous conveyor means for separate sheets including improved means for overlapping the successive sheets.

Another object is to provide improved apparatus for activating the bonding material between the overlapped margins of the successive sheets so as to connect the overlapped sheets into a continuous web.

Another object is to provide an improved apparatus for synchronously punching, overlapping, numbering, printing and perforating documents of value in order to form a continuous web of such documents.

Another object is to provide an improved driving mechanism for apparatus of the type described including means for advancing the separate sheets either independently of or synchronously with the formed web.

Another object of the invention is to provide apparatus of the type described in which the bonding material used is heat sensitive and the activating apparatus is a heater. A further object is to provide improved heater apparatus of the type described including means for removing the heater from contact with the web whenever the forward movement of the web is stopped.

The foregoing objects are attained in the product, method and apparatus described herein. The continuous web product according to the invention consists of a succession of separate sheets, each having a pair of longitudinal edges and a pair of transverse edges. The transverse margins are overlapped and are bonded together at the overlap so as to form a continuous web. The sheets are punched with spaced holes along the longitudinal margins, as is conventional with continuous forms. The holes are located accurately with respect to the edges and hence with respect to the printing on the forms, and are utilized to control the registry of the subsequent numbering and other printing with the original printed matter on the forms.

In the method according to the invention, each sheet is first coated along one surface of one transverse margin with heat sensitive bonding material. The sheet is then punched along the longitudinal margins, taking care to locate the punched holes accurately with respect to the edges of the sheet. The punched and coated sheets are then overlapped so that each coated margin faces a transverse marginal surface on another sheet. The bonding material between the overlapped margins is then activated by heating, thereby completing the forming of the continuous web. The forms in the web may then be additionally printed with consecutive numbers, and in some cases, with additional material, e.g., signatures. If the web is to be used in machines employing an accordion folded web, then a row of perforations is provided on one side of the overlapped margins to produce a fold line. In some cases, another line of perforations on the opposite side of the overlapped margins may be desired to facilitate the separation of the overlapped margins after the forms are completed. The finished forms are then subjected to inspection. If any damaged or misnumbered forms are observed, the web may be interrupted by the application of heat to the overlapped margins on either side of the damaged form, thereby releasing the heat-sensitive bonds at those points. A manually prepared and numbered form may then be inserted in the web to replace the one removed.

The apparatus of the invention includes a coating unit through which the sheets are moved successively, with the edges which appear as transverse edges in the finished product moving longitudinally of the coating apparatus. It is convenient to locate this unit at right angles to the line of travel of the sheets through the succeeding units of the apparatus, where these coated edges extend transversely of the direction of the movement. It is further convenient, although not necessary, to drive the coating apparatus separately from the other parts of the apparatus to permit inspection of the coated sheets before they are introduced into the succeeding units. Sheets coated by the coating unit are then moved successively through a series of units including, in the order named, a punching unit, an overlapping unit, a heater unit, and numbering, printing and perforating units. The punching unit punches guide holes along the longitudinal margins of the sheets, and locates the holes accurately with respect to the sheet edges, so that the holes may be used as guide holes for the subsequent overlapping, bonding, numbering and other operations. The overlapping apparatus includes mechanism for accelerating each sheet so that its leading margin overtakes the trailing margin of the preceding sheet. When this overtaking occurs, the guide holes in the sheets are engaged by pins on a pinbelt to drive the successive sheets through a heater apparatus. The heater apparatus includes a plurality of heater bars carried by endless chains and extending transversely of the line of travel of the web. The heater bars are preferably located above the web and extend above a corresponding plurality of back up bars located below the web. Each heater bar cooperates with a backup bar and is effective to apply heat and pressure to one of the pairs of overlapped margins in the web. Upon leaving the heater, the web passes through a cooling unit, where the pressure is maintained on the overlapped margins, but without the application of heat. The web is continuous as it leaves the cooling unit. It subsequently passes through numbering, printing and perforating units, whose operations on the web are synchronized by the use of the punched holes as guides.

Other objects and advantages of the invention will become apparent from the consideration of the following specification and claims, taken together with the accompanying drawings.

In the drawings:

FIG. 1 is a block diagram of apparatus embodying the invention, and serving as an index to the other figures of the drawing;

FIG. 2 is a plan view of a printed sheet of the type to which the invention may be applied;

FIG. 3 is a plan view of a finished web embodying the invention formed from individual sheets as shown in FIG. 2;

FIG. 4 is an elevational view, partly diagrammatic, of a margin coating unit embodying certain features of the invention;

FIG. 5 is a fragmentary plan view of the margin coating unit of FIG. 4;

FIG. 6 is a view taken on the line 6—6 of FIG. 4, looking in the direction of the arrows, and on an enlarged scale;

FIG. 7 is a view taken on the line 7—7 of FIG. 6, looking in the direction of the arrows and on a further enlarged scale;

FIG. 8 is a view taken on the line 8—8 of FIG. 4, looking in the direction of the arrows, and on an enlarged scale;

FIG. 9 is a view, partly in elevation and partly in section, of a sheet feeding apparatus at the entrance to the punching unit;

FIG. 10 is a view taken on the line 10—10 of FIG. 9;

FIG. 11 is an elevational view of a punching unit embodying certain features of the invention;

FIG. 14 is a fragmentary view similar to FIG. 12, but on an enlarged scale, and illustrating certain details omitted in FIG. 12;

FIG. 14A is an enlarged fragmentary view, taken on the line 14A—14A of FIG. 14;

FIG. 15 is a fragmentary view showing a portion of the drive mechanism which cooperates with the mechanism of FIG. 14;

FIG. 16 is a cross-sectional view taken on the line 16—16 of FIG. 14, showing a starter roller of the punching unit and operating mechanism therefor;

FIG. 17 is a view similar to FIG. 16, showing the parts in a different position;

FIG. 18 is a view showing an overlapping unit embodying certain features of the invention, together with a portion of the bonding unit which embodies certain other features of the invention;

FIG. 19 is a plan view of the overlapping unit of FIG. 18, with certain parts broken away;

FIG. 20 is a sectional view taken on the line 20—20 of FIG. 19;

FIG. 21 is a fragmentary sectional view taken on line 21—21 of FIG. 20;

FIG. 22 is a sectional view taken on line 22—22 of FIG. 18;

FIG. 23 is a fragmentary sectional view taken on line 23—23 of FIG. 19;

FIG. 24 is a view partly in elevation and partly in section on line 24—24 of FIG. 26, showing on an enlarged scale the retractable pin sheet driving mechanism employed in the overlapping unit;

FIG. 25 is a sectional view on line 25—25 of FIG. 22;

FIG. 26 is a sectional view taken on the line 26—26 of FIG. 25, on an enlarged scale;

FIGS. 27 to 31 show the essential parts of the overlapping unit of FIGS. 18 to 25 in five successive operating positions;

FIG. 32 is an elevational view showing the bonding unit for connecting the sheets together to form a continuous web;

FIG. 33 is a fragmentary sectional view taken on line 33—33 of FIG. 32;

FIG. 34 is a sectional view taken on line 34—34 of FIG. 32;

FIG. 35 is a sectional view taken on line 35—35 of FIG. 34;

FIG. 36 is a fragmentary sectional view taken on the line 36—36 of FIG. 35;

FIG. 37 is a fragmentary elevational view, on an enlarged scale, showing part of a tripping mechanism in the bonding unit;

FIG. 38 is a view similar to FIG. 37, showing the parts in a different operating position;

FIG. 39 is a sectional view in continuation of FIG. 23, showing the cooling section of the bonding unit;

FIG. 40 is a sectional view taken on the line 40—40 of FIG. 39;

FIG. 41 is an elevational view showing the principal parts of the numbering and printing units; and FIG. 42 is an elevational view showing the principal parts of the perforating and folding units.

FIG. 1

Figure 12:
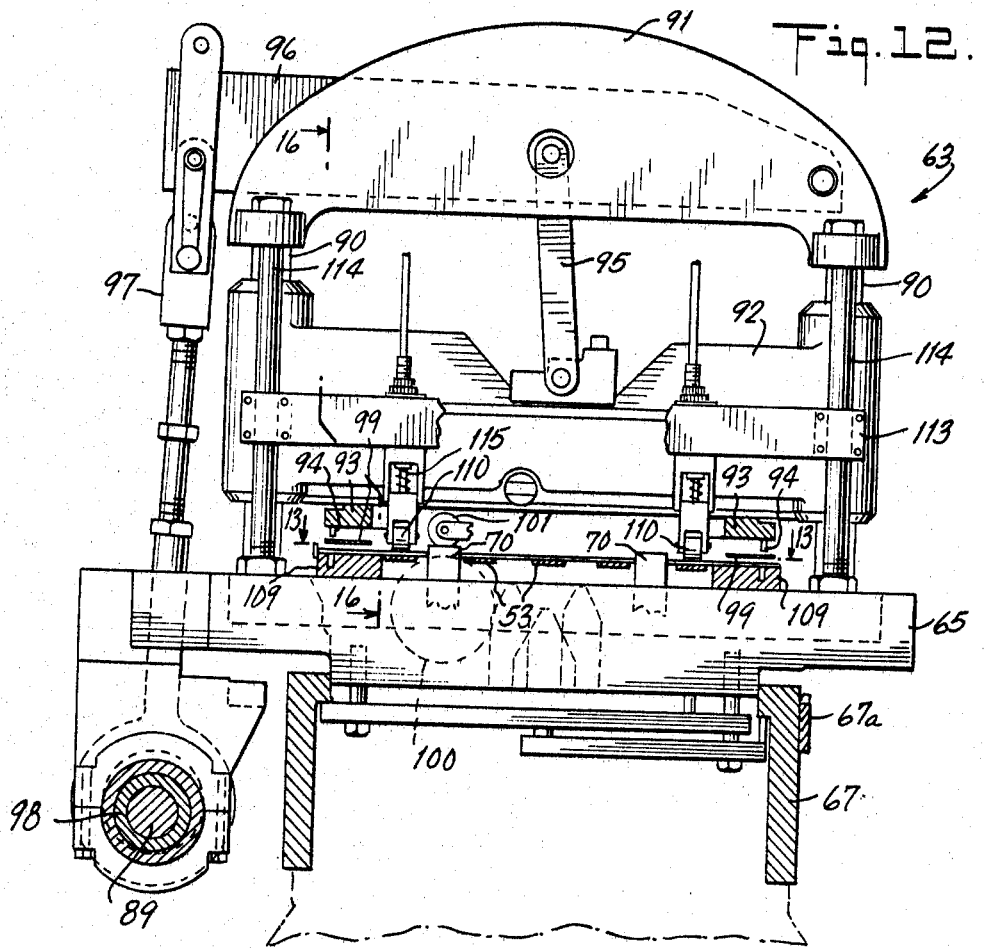
FIG. 12 is a view partly in elevation and partly in section on line 12—12 of FIG. 11, with certain parts broken away.
Figure 13:
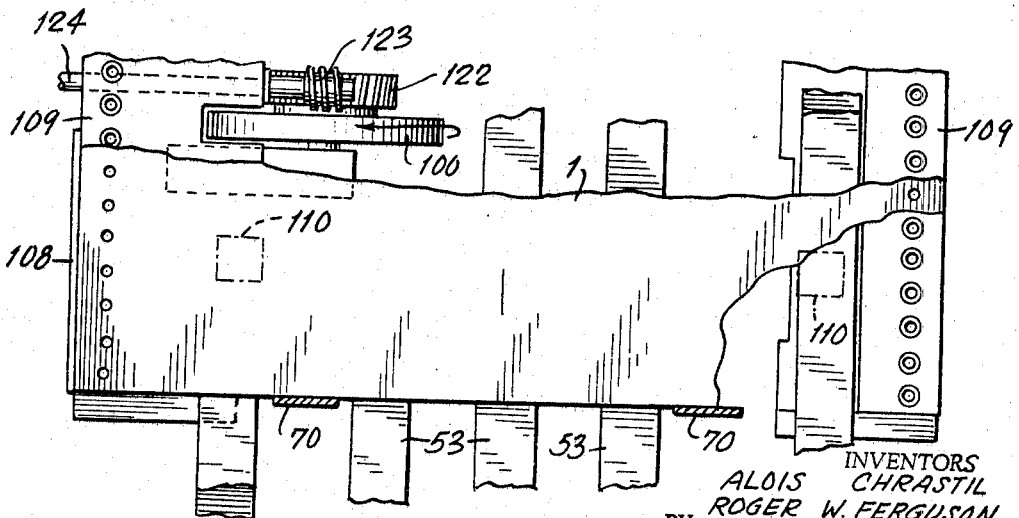
FIG. 13 is a fragmentary sectional view taken on the line 13—13 of FIG. 12.

This figure illustrates diagrammatically the principal units of an apparatus embodying the invention and indicates the sequence of flow of sheets and of the finished web through the various units.

Printed sheets 1 are fed from a stack to a margin coating unit 2 illustrated in detail in FIGS. 4 to 8, and are delivered from the margin coating unit to a sheet feeder 3 (FIGS. 9 and 10). The sheets are fed by the feeder to a punching unit 4 shown in detail in FIGS. 11 to 17. While it is possible to feed individual sheets directly from the margin coating unit 2 to the punching unit 4 without intermediate stacking, the use of an intermediate stack permits an inspection of the sheets leaving the margin coating unit and removal of defective sheets at that point, thus eliminating a certain proportion of the difficulties which might be encountered in subsequent units if the defective sheets were allowed to proceed.

The sheets move from the punching unit 4 to an overlapping unit 5, shown in detail in FIGS. 18 to 31. The sheets move through the punching unit as separate sheets. In the overlapping unit, each sheet is accelerated until its leading margin overlaps the trailing margin of the preceding sheet.

The sheets pass from the overlapping unit 5 to a bonding unit 6, illustrated in detail in FIGS. 32 to 40. In the bonding unit, the overlapped margins of the sheets are bonded together and thereby formed into a continuous web. That web proceeds from the bonding unit 6 through a numbering unit 7, a perforating unit 8 and a folding unit 9, from which it is delivered as a finished web diagrammatically indicated at 10.

The margin coating unit is driven by a motor 11. All the subsequent units are driven by a single motor 12, which is directly connected to the sheet feeder 3 and the punching unit 4. The motor 12 is connected through a single toothed clutch 13, to the overlapping unit 5, bonding unit 6, numbering unit 7, perforating unit 8 and the folding unit 9. The purpose of the single toothed clutch is to enable stopping of those units which are concerned with the feeding of the continuous web while allowing the preceding units to continue in operation until the sheets therein are ready for the overlapping unit, thereby maintaining continuity of the web. The use of a single toothed clutch 13, i.e., a clutch whose clutch members can engage each other in only one angular position, ensures that the driving mechanisms are operated in the proper phase synchronism so that the individual sheets overtake and are attached to the preceding finished web in the correct overlapping relationship.

FIG. 2

This figure illustrates a sheet 1 which may, for example, be a stock certificate, having the name of the issuing company appearing thereon at 14 and a space for a serial number provided at 15. The certificate may also be provided with a field 16 for a punched code. The sheet 1 has two shorter edges, hereinafter referred to as the longitudinal edges 1a and 1b, and two longer edges, hereinafter referred to as the transverse edges 1c and 1d.

FIG. 3

This figure illustrates a continuous web 10 which may be formed by passing sheets through the apparatus diagrammatically illustrated in FIG. 1. There appear in FIG. 3 one complete sheet 1 and portions of the preceding and following sheets. Note that the transverse marginal portions of each sheet 1, i.e., the margins adjacent the transverse edges 1c and 1d, overlap the margins of the adjacent sheets. At the overlapped marginal region 18, the successive sheets are bonded together with heat sensitive bonding material. Adjacent each of the overlapped margins, each sheet 1 is provided with a row of perforations 1e, 1f, extending transversely of the sheet. By the use of these perforations, the stock certificates can be separated and the overlapped portions 18 removed after the operation of filling in the blanks on the certificates is completed. Along the longitudinal margins of the sheet there are provided rows of punched holes 17. Note that one pair of punched holes 17 appears in each transverse margin of each sheet, and that the holes in the transverse margin of the successive sheets are accurately aligned. In the operation to be described below, the punching of the holes takes place in the punching unit 4, after the application of bonding material to the transverse margins in the coating unit 2. The holes 17 are punched in locations accurately determined with respect to the edges of the sheets 1. The holes are then utilized as guide holes for each of the subsequent operations, including overlapping, bonding, numbering and perforating and folding.

If the sheets are to be separated by cutting, one of the two rows of perforations 1e, 1f may be omitted if the forms are to be shipped folded, the other row being used to assist the folding. If the sheets are to be separated by bursting, then both rows of perforations are required.

It should be recognized by those skilled in the art that the web 10 can be built up from sheets 1 by a series of manual operations, including: the application of bonding material to the transverse margins of the sheets; the punching of guide holes in the longitudinal margins of the sheets; the overlapping of the sheets; the bonding of the sheets together to form a continuous web; and the subsequent numbering of the sheets.

The adaptability of this continuous web product to manufacture by a series of manual steps is of considerable importance where the sheets concerned are documents of value such as stock certificate blanks, etc. It is highly desirable that such blanks be delivered from the printers to the customer consecutively numbered so as to facilitate accounting for the individual blanks, and to make sure that none of the blanks are withdrawn or omitted from the certificate handling operations. Any complex printing operation such as is required for these stock certificate blanks involves a certain amount of spoilage. By virtue of the adaptability of this particular web structure to manual assembly, the web may be inspected, for example, between the perforating unit 8 and the folding unit 9. Any damaged or misprinted or misnumbered certificates can be noted in that inspection. In a subsequent operation, the damaged certificates may be manually withdrawn from the finished web by simply applying heat and pressure to the overlapped marginal portions on each side of the damaged certificate or certificates, thereby activating the bonding material and loosening the bond to allow the sheets to be easily separated. Corrected certificates may then be prepared manually and inserted in place of the withdrawn certificates in the finished web. It is therefore ensured that the certificates as delivered to the customer will be usable and consecutively numbered and thus adaptable to accurate accounting.

FIGS. 4–8

These figures illustrate the details of the marginal coating unit shown diagrammatically at 2 in FIG. 1.

Referring to FIG. 4, the individual sheets are taken from a stack 20 by any suitable type of sheet feeding mechanism, which may include a pneumatic lifter indicated at 21, and are fed to a sheet conveyor 22 including upper belts 23 and lower belts 24. The sheets moving between the two sets of belts are held thereby against undesired motion with respect to the conveyor. From the conveyor 22 the sheets pass to the coating mechanism 25, which also includes a set of upper conveyor belts 26 and a set of lower conveyor belts 27. The belts 26 and 27 carry the sheets so that their transverse margins 18 run against the periphery of a wheel 28, which is continuously rotating in synchronism with the belts 26 and 27, and has its lower periphery dipping below the level of heat-sensitive bonding material in a tank 29. As the sheets approach the wheel 28, they are engaged by a pair of flexible side guides 19 (see FIG. 5) which align the sheets so that the lower margin thereof, as it appears in FIG. 5, passes over the periphery of the wheel 28. A cylinder 30 of the same diameter as the wheel 28 is engaged by the belts of the lower conveyor 27. The wheel 28 and the cylinder 30 project upwardly above the general plane of the path of travel of the sheets as they are carried forward by the belts 25 and 27, so that the entire width of each sheet moves along an arcuate path, without any tendency to twist. Each sheet remains in contact with the periphery of the wheel 28 for a predetermined length of time. Above the wheel 28, there is provided a stationary guide 31, having an under surface concentric with the wheel 28 and flaring upwardly at its ends, as best seen in FIG. 7. The guide is supported on a rod 32 adjustably supported by a nut 33 on the end of a bracket 34, which overhangs the wheel 28. The guide 31 is set to a position wherein the spacing between it and the wheel 28 is just slightly greater than the thickness of the sheet 1. This guide 31 is thereby effective to hold the sheet firmly and smoothly in contact with the periphery of wheel 28. A pair of fixed transverse rollers 31a (FIGS. 4 and 7) perform a similar guiding function for the conveyor belts 26.

A heater 35 is provided in the tank 29 to maintain the bonding material in a liquid condition. The bonding material supply in the tank 29 is maintained at a predetermined level by suitable controls, and is supplied from a reservoir 36 through a pump 37 and a conduit 38. The reservoir 36 and conduit 38 may also be provided with heaters to maintain the material fluid. The coated sheets pass from the coating apparatus 25 to another conveyor including a set of lower belts 39, running over a table 40. The table 40 extends under all of the sheets except their coated margins 18. Mounted on the table 40 and along an edge thereof so as to underlie the coated margins is a pipe 41 provided with a series of apertures 41a in its upper surface, and connected to a compressed air supply through a conduit 42. The air flowing over the coated margins 18 is effective to cool and dry the bonding material on those margins so as to deactivate that bonding material. The sheets passing from the conveyor 39 may then move into a stacking mechanism 43 and be stacked without sticking together.

By a heat-activatable material is meant one which is liquid and tacky when hot (e.g., 325° F.) and which is solid and non-tacky when cold. Sheets bonded together with such material may be separated by subjecting the bonded connection to heat and pressure, thereby liquefying and making tacky the bond between the sheets. On the other hand, sheets coated with such material which has been cooled may be bonded together by placing the coated sheets in contact and applying pressure along with heat sufficient to activate the material, and thereafter maintaining the pressure while allowing the bonding material to cool.

FIGS. 9–10

These figures illustrate an apparatus for taking from a stack 43 sheets having their leading margins coated on the under side with heat-sensitive bonding material and advancing them to a punching unit to be described below in connection with FIGS. 11 to 17.

The sheets are removed from the stack 43 by any suitable sheet feeding apparatus, which may include a vacuum lifter 44, and are fed through rollers 45 to a downwardly inclined plane 46 along which they travel until stopped by a pair of front guides 47. The front guides 47 consist of a pair of arms fixed on a shaft 48 rotatable by a gear 49 also fixed on the shaft and engaging a gear segment 50 fixed on a shaft 51 and reciprocated by a link 52 driven by a cam mechanism (not shown) on the output shaft of the motor 12 (see FIG. 1). The front guides 47 are thereby operated in synchronism with the punching unit 4 and the subsequent units of the apparatus, so that the guides 47 drop and allow a sheet to advance on to a conveyor belt 53 at the same time that the preceding sheet is moving out of the punching unit 4. To assist sheet 1 in moving off the inclined plane 46, the shaft 48 carries a plurality of rollers 54 which rotate in a direction to move the sheet 1 forward at the same time that the front guides 47 are retracted. A plurality of cooperating rollers 55 are fixed on a shaft 56 carried by a pair of arms 57 fixed on a shaft 58 journaled in a fixed frame 59. The shaft 58 is rotatable by means of a crank arm 60 connected by a link 61 to another cam mechanism (not shown) operated by the output shaft of the motor 12. That cam mechanism operates to bring the rollers 55 down into contact with the upper surface of a sheet 1 at the same time that the sheet is released by the fingers 47. The sheet is thus compressed between the rollers 55 and the rollers 54, which are at this time being rotated by operation of the sector gear 50. This gear is effective to turn the rollers 54 far enough to advance the sheet into the space between the continuously running conveyor belt 53 and a cooperating pressure roller 62.

FIGS. 11–17—THE PUNCHING UNIT

These figures illustrate the punching unit shown diagrammatically at 4 in FIG. 1, which is effective to punch the rows of holes 17 along the longitudinal edges of the sheet 1, as they appear in FIG. 3. This punching unit 4 also punches the code in the code field 16, if that field is used.

The complete puuching unit 4 is best seen in the overall elevational view of FIG. 11. The conveyor belt 53 which was mentioned in connection with FIG. 9 carries the sheets completely through the punching unit and past a first punch mechanism 63, and a second punch mechanism 64.

The punch mechanism 63 is effective to punch in each sheet the rows of longitudinal holes 17 (FIG. 3). Punch mechanism 64 is utilized to punch the code holes in the code field 16 of FIG. 3. The punch mechanism 63 is mounted on a carriage shown at 65 movable along a stationary frame 67 by means of pinion gear 68 cooperating with a rack 67a formed on the stationary frame 67. The movement of the carriage 65 along the frame 67 is for adjusting the punch mechanism 63 for varying sizes of the sheets 1.

The punch mechanism 64 is mounted on a carriage shown at 66 movable along a stationary frame 67 by means of pinion gear 69 cooperating with a rack 67a formed on the stationary frame 67. The movement of the carriage 66 along the frame 67 is to adjust the punch mechanism 64 for varying locations of the field 16.

The sheets moving along the conveyor belt 53 are stopped in alignment with the punch mechanism 63 by a pair of front guides 70 carried at the end of arms 71 fixed on a shaft 72. A spring 73 encircles a rod 74 between a fixed abutment 75 and a flange 76 attached to the rod 74, and acts to move rod 74 upwardly. At its upper end, the rod 74 carries a fork 74a which is fixed to the arm 71. The front guides 70 are thus biased upwardly into the sheet stopping position illustrated in FIG. 11. A fixed stop 77 limits the upward movement of arm 71.

A similar pair of front guides 78 carried on arms 79 fixed on a shaft 80 are provided in association with the punch mechanism 64. The shafts 72 and 80 carry crank arms 81 and 82 respectively, which are connected by a link 83. A spring 84 biases the link 83 and arms 81 and 82 into the sheet stopping position. A clamp 85 engages the link 83 near the middle thereof and is carried on one arm of a bell crank lever 86 carrying on its other arm a cam follower roller 87 which engages the cam 88 driven synchronously with the main drive shaft 89 of the punch unit. The cam 88 is shaped so that the front guides 70 and 78 are normally in the sheet stopping positions shown. After each punching operation, the guides 70 and 78 are momentarily retracted by a riser on the cam 88 to allow the punched sheets to proceed to the next operation. The conveyor belt 53 runs continuously, as mentioned above.

The punch unit 63 includes a pair of columns 90 which extend upwardly from the carriage 65. The upper ends of the columns 90 are connected by a transverse yoke 91 which includes a pair of parallel beams 91a and 91b (see FIG. 16).

A cross-head 92 slides vertically on the columns 90 and carries on its under surface a pair of punch bars 93 from which downwardly project a set of punches 94 for punching the holes 17. The cross-head 92 is moved vertically by a connecting rod 95 pivotally connected at its lower end to the cross-head 92 and at its upper end to a lever 96. The right-hand end of lever 96, as viewed in FIG. 12, is pivoted to the yoke 91. The left-hand end of lever 96 is reciprocated vertically by a link generally indicated at 97, driven by an eccentric 98 on the shaft 89. The eccentric 98 is keyed to the shaft 89 and is slidable along it sufficiently to allow for movement of the punch 64 by means of the rack 67a and pinion 68.

A pair of stripper plates 99 (see FIGS. 14 and 14A) are provided under the punch bars 93. Each stripper plate 99 is provided with a series of holes aligned with the punch pins 94, and is yieldably supported on its associated punch bar 93, for example, by means of springs 100 (FIG. 14) encircling guide rods. Suitable means are provided for limiting the downward movement of the stripper plates away from the punch bars 93. The stripper plates are located between the punch bars and the sheets 1 during the punching operation. After the punches 94 have punched holes in the sheet and are being retracted, the stripper bar holds the sheet down so that it does not tend to follow the punches 94 upwardly. The under surfaces of the stripper bars 99 are relieved adjacent the end punches, as shown at 99a in FIG. 14A, to provide a slight recess in the under surface of the stripper bar just above the coated margin 18 of the sheet 1. By virtue of this recess, the coated margin 18 is not subjected to pressure from the punch during the punching operation, which might otherwise tend to activate the bonding material and cause the sheet to stick to either the parts of the punch or the conveyor belt.

Atfer each sheet 1 is stopped by the front guides 70 under the punch mechanism 63, it is driven laterally by a raised land on a wheel 100a (FIGS. 12 and 14) located below the sheet and between two of the belts of the conveyor 53. Above sheet 1 and in alignment with the wheel 100a is a cooperating pressure roller 101, rotatably mounted on one arm of a bell crank 102, pivoted on a stationary bracket 104. The other end of the bell crank 102 is connected by a link 103 and another bell crank 104 to a push rod 105 biased downwardly by a spring 105a and actuated by a cam follower 106 at its lower end cooperating with a cam 107 on the drive shaft 89. The cam 107 is contoured to bring the pressure roller 101 down into contact with the upper surface of the paper sheet just before the punch moves downwardly. The sheet is thereby compressively engaged between the wheel 100a and roller 101 and is driven laterally against a side guide 108 fixed to the carriage 65. After the sheet engages the side guide 108, the land on wheel 100a and the roller 101 turns in frictional engagement with the sheet. Adjustment of the tension of spring 105a controls this frictional engagement. The time of engagement of the pressure roller 101 with the sheet is only momentary, since the movement of the sheet required to engage the side guide 108 is very small. Consequently, the engagement of the sheet between the land on wheel 100a and roller 101 does not continue long enough to cause buckling of the sheet.

The wheel 100a is driven by a worm wheel 122 (FIG. 13) which engages a worm 123 fixed on a shaft 124. The shaft 124 is driven by means not shown in synchronism with the main drive shaft 89. The gear ratio is such that the wheel 100a rotates one revolution during the passage of each sheet 1 through the punch.

After the sheet is engaged by the front guides 70 and the side guide 108, it is accurately located with respect to the punches 94. The printing on the sheet has been previously located accurately with respect to the sheet edges. The guide holes 17 produced by the punches 94 are now similarly to be located accurately with respect to the sheet edges, and hence with respect to the printing on the sheet.

When the cross-head 92 travels downwardly during the punching operation, the stripper bar 99 first engages the sheet. Thereafter the punches 94 move downwardly through the holes in the stripper bar to punch holes in the sheet. The punches 94 are aligned with holes in a bottom die 109 so as to cut sharply defined holes in the sheet. When the cross-head 92 is lifted, the stripper bars 99 remain in engagement with the sheet while the punches move away from it. The strippers thereby eliminate any tendency of the sheet to stick to the punches 94.

After the cross-head 92 is retracted, a pair of starter rollers 110 are moved downwardly momentarily into engagement with the upper surface of the sheet to force it into firm frictional engagement with the underlying belts 53, which are continuously moving forward. During the punching operation, while the sheet is stopped, these belts have been sliding under the sheet. Unless some action is taken to momentarily increase the frictional engagement between the belts and the sheet, they might continue to slip, and delay the movement of the sheet out from under the punch. It is desirable to get the sheet moving promptly upon raising of the punch so that a new sheet can be moved in ready for the next operation. the starter wheels 110 perform this function.

Each starter wheel 110 is carried by a yoke 111 fixed on the end of a rod 112. The rod 112 is slidable in a fixed frame member 13 attached to a pair of posts 114 mounted on the carriage 65. A spring 115 encircles the rod 112 below the frame member 113, and acts in a direction to bias the wheel 110 downwardly. The upper end of the rod 112 is connected to a crank arm 116 (FIGS. 16 and 17), fixed on a shaft 117 which is rotated by another crank arm 118 (FIG. 14) connected by a link 119 to a lever 120 (FIG. 15) fixed at its center and supporting at its opposite end a cam follower 121 cooperating with a cam 122 on the shaft 89. The cam 122 is contoured so as to move the rod 112 downwardly momnetarily during the upward stroke of the punch crosshead 92, thereby moving the wheel 110 to the position shown in FIG. 17, in which it momentarily engages the sheet 1 and forces it into engagement with a belt 53 of the conveyor. A momentary contact is sufficient to get the sheet 1 moving again with the conveyor belt 53.

All the connections between the drive shaft 89 and the various cams and eccentrics for punch 64 are made adjustable along the shaft to accommodate movement of carriage 66 by means of rack 67a and pinion 68.

After the sheet 1 leaves the punching unit 63, it is stopped again under the punching unit 64 by the guides 78. The punching unit 64 may not be used, in which case the guides 78 can be arranged to be permanently retracted by suitable adjustment of their operating mechanism. The punch unit 64 is entirely conventional. The only feature of punch 64 related to the present invention is its coordination with the other units of the apparatus disclosed herein. Upon leaving the punch unit 64, the sheets 1 are carried by conveyor belts 53 to the overlapping unit 5 shown diagrammatically in FIG. 1 and illustrated in detail in FIGS. 18 to 31.

FIGS. 18–31—OVERLAPPING UNIT 5

In the overlapping unit 5, each advancing sheet 1 is accelerated until its leading edge overtakes the trailing edge of the preceding sheet. The margins of the sheets are overlapped with the surface 18 coated with bonding material in facing engagement with the margin of the preceding sheet. The sequence of operation in the overlapping unit 5 is best illustrated in FIGS. 27 to 31. In FIG. 27, sheet 1, which is being advanced by the conveyor belts 56, moves onto a support 125 at the entrance of the overlapping unit 5. At the end of the support 125, a front guide 126 is in position to stop the advancing movement of the sheet 1, as illustrated in FIG. 28. Above the margins of the sheet 1 when it is stopped by the front guide 126, are a pair of retractable pin drive wheels 127, which at this time have their pins 128 retracted. The peripheries of the wheels are spaced slightly above the sheet 1. After the sheet 1 is stopped at the front guides 126, the retractable pins 128 in the drive wheel 127 are moved outwardly into engagement with the pin holes in the sheet 1, as shown in FIG. 29. The front guide 126 is then moved away from the leading edge of the sheet and the drive wheel 127 starts rotating, advancing the sheet positively at a speed determined by the speed of rotation of the drive wheels 127, due to the positive engagement between the pins 128 and the guide holes 17 in the margin of the sheet.

Another pair of drive wheels 129 is located in the overlapping unit 5. The wheels 129 are driven in synchronism with the wheels 127. These two sets of drive wheels 127 and 129 are now accelerated, thereby accelerating the sheet 1 sufficiently so that its leading transverse edge will overtake the trailing edge of the preceding sheet, as shown in FIGS. 30 and 31. As the leading edge of the sheet 1 approaches the trailing edge of the preceding sheet, the front edge is lifted by a set of lifters 130, so that the leading edge of the sheet 1 passes above the trailing edge of the preceding sheet. The preceding sheet at this time is being driven at a constant speed by a pair of pin belts 131 passing over drive wheels 132. Although, within the broader aspects of the invention it is not absolutely necessary, substantial advantages as to accuracy of register may be gained by coorinating the location of the guide holes 17 with the accelerating movement of the drive wheels 127 and 129 and the constant speed of the drive wheels 132 so that the last guide hole in the preceding sheet and the first guide hole in the following sheet are both engaged by the same pin 131a (see FIG. 31). In other words, it is preferred to have a pair of holes in each sheet within each of its overlapped transverse margins, and to have the pairs of holes in the overlapping margins accurately aligned. Nevertheless, a register which is reasonably accurate for some purposes may be maintained by spacing the holes so that there are no guide holes within the overlapped margins.

After the leading edge of the following sheet passes the trailing edge of the preceding sheet, the lifters 130 are retracted downwardly so that the leading margin of the following sheet is free to drop onto the upper surface of the preceding sheet, and is thus engaged by the pins 131a.

The mechanism for operating the front guides 126 is best seen in FIG. 25. The guides 126 are supported at the ends of arms 133 fixed on a shaft 134. The shaft 134 is operated by a crank arm 135 carrying at its end a cam follower 136 cooperating with a cam 137 on a shaft 138 driven from the main drive shaft section 200 which is driven from the the single toothed clutch 13 (see FIG. 1). The front guides 126 are normally in the sheet stopping position illustrated in FIG. 25 and are retracted from that position long enough to allow an advancing sheet to pass over them, after which they are restored to their normal positions (see FIGS. 27 to 31).

The retractable pin drive wheels 127 and 129 are illustrated in detail in FIGS. 24 and 26. These wheels are commercially available devices, and are explained in some detail herein only to ensure a clear understanding of the present invention. Each of these wheels comprises a cylindrical housing 139 fixed on a shaft 140 for rotation therewith. The housing 139 is provided with a plurality of radial passages 139a, each of which extends from the the periphery of the housing into a chamber within the housing. The outer portions of these radial passages 139a are of relatively small diameter, just sufficient to allow the passage of a blunt nosed pin 128. The inner end of the pin 128 is fixed on a piston 142 of somewhat larger diameter than the pin 128 and sliding in an enlarged extension of the passage 139a. Each piston 142 is provided with a slot 142a (FIG. 26) in one side thereof. This slot receives an eccentric rib 143 formed on the side of a plate 144, which is freely rotatable on the shaft 140 and is also rotatable with respect to the housing 139. The plate 144 is attached to an arm 145 extending to the left as viewed in FIG. 24 and pivotally connected at 146 to a link 147.

The housing 139 rotates with the shaft 140 carrying the pins 141 and piston 142 with it. As the housing 139 rotates, the radial positions of the pistons 142 are determined by the engagement of their slots 142a with the eccentric rib 143. When the arm 145 has the position shown in FIG. 24, the pins are retracted when they are at the lowermost position of the housing 139, and are gradually projected from the housing as they approach the uppermost position of the housing 139. By rotating the arm 145 through a suitable angle (for example, 60° clockwise), the plate 144 is rotated far enough to bring the eccentric rib 143 to a position such that the pins are projected from the housing 139 at the lowest position thereof, and thereby extend through the holes 17 in a sheet 1 which may be aligned with the drive wheel 127.

The mechanism for operating the two links 147 on the opposite sides of the overlapping unit 5 is best shown in FIG. 25. The lower end of each link 147 is connected to one end of a lever 148 pivoted on a shaft 149 and biased upwardly by a spring 150. The other end of lever 148 carries a follower 151 cooperating with a cam 152 fixed on the shaft 138. The cam 152 is contoured so that at appropriate times during each revolution of shaft 138, the link 147 and arm 145 are moved upwardly from the position shown in FIG. 25 sufficiently far to change the pins 141 in wheels 127 from their retracted position to their projected position.

The shaft 140 carrying the drive wheels 127 and a similar shaft 153 carrying the drive wheels 129 are maintained in synchronism by a chain 154 passing over sprockets 154a (FIG. 20) fixed on the respective shafts 140 and 153. These shafts are driven at a speed which varies in a repeated cycle of three successive phases. In the first phase, the two shafts and the drive wheels 127 and 129 are stationary, and the pins of wheels 127 are retracted, as shown in FIG. 28. In the second phase, the pins 128 have been projected from the wheels 127, and the two wheels are rotated in synchronism in an accelerating phase to advance the sheet 1 rapidly enough for its leading edge to overtake the trailing edge of the preceding sheet. This phase is illustrated in FIGS. 29 and 30. After the leading edge of the following sheet has overtaken the trailing edge of the preceding sheet, the drive wheels 127 and 129 are slowed down to a speed in synchronism with the drive wheels 132, so that the preceding and following sheets are then moving forward at the same speed and the leading guide holes in the following sheet fall into place over the pins 131a which engage the trailing guide holes in the preceding sheet. After the sheet 1 passes out of engagement with the drive wheels 129, both wheels 127 and 129 are stopped and the cycle of speed variation of the wheels 127 and 129 repeats.

This cycle of speed variation is accomplished by a cylindrical cam shown at 155 in FIGS. 18 to 20, having a cam groove 155a, 155b, 155c cut in its peripheral surface. The cam groove cooperates with a set of three followers 156 (FIGS. 19–21) which are carried on a chain 157 extending over sprocket wheels 158 and 159 mounted respectively on shafts 160 and 161. The followers 156 are spaced along the chain 157 by a distance substantially equal to the axial length of the cam 155, so that when one of the followers 156 is leaving one end of the cam groove, another one is entering the other end of the groove. The cylindrical cam 155 is fixed on a shaft 162, connected through a bevel gear generally indicated at 163 to a vertical shaft 164 driven through helical gears 165, 166 from the main drive shaft section 200. The groove has three phases of contour, 155a, 155b, 155c, corresponding to the three phases of speed in the cycle of operation of the pin drive wheels 127. As seen in FIG. 19, the groove 155a is a portion extending generally vertical in that figure, which corresponds to the initial phase (FIG. 28) when the followers 156 and pin drive wheels 127 connected thereto are stopped. Following the groove to the left from the vertical portion 155a, there is encountered a portion 155b of rapidly increasing pitch, which corresponds to the accelerating phase of the pin drive wheel, and finally a portion 155c of relatively constant pitch, parts of which portion appear at both ends of the cam 155, in which the followers 156 are driven at constant speed.

The shaft 160 carries a gear 168 (FIGS. 19 and 25) which meshes with another gear 169 on a shaft 170 connected by a chain 172 to a sprocket on the shaft 140. The shaft 140, as described above, carries the retractable pin drive wheels 127 and is also synchronously connected to the shaft 153 carrying the retractable pin drive wheels 129.

The sheets 1 moving through the overlapping unit 5 are supported on a plurality of parallel bars 173 (FIGS. 19–20) attached to the tops of a beam 174 (FIGS. 19 and 23) which extends between side frame members 175 of the unit 5. Along the paths traveled by the longitudinal edges of a sheet, the beam 174 supports a pair of tracks 176. At least in the regions underneath the pin drive wheels 127 and 1299, the tracks 176 are provided with a central groove 176a to receive the pins 128 when they project from the wheels 127. The plates 144 on drive wheels 129 are set so that those pins continuously project into positions to engage the holes in sheets 1.

The overlapping unit 5 is provided with a side guide and a lateral drive mechanism similar to that provided for the punch unit 4, for the purpose of aligning the sheets laterally with the pin drive wheels 127. This side guide mechanism is not illustrated in the drawings, for the purpose of simplifying them.

The lifters 130 (FIGS. 19 and 23) are elongated flexible fingers supported on a bar 177 extending transversely of the overlapping unit 5 and fixed on a rotatable shaft 178. The shaft 178 carries an arm 179 (FIG. 23), which supports at its end a cam follower 180 cooperating with a cam 181 mounted on the shaft 160.

The principal torque for rotating the shaft 160 is supplied from the main drive shaft through shaft 138 (see FIGS. 18 and 22), gears 182 and 183, shaft 184, chain 185, shaft 186 and a magnetic clutch 187 connected between shaft 186 and shaft 160. The gear ratio between shaft 138 and shaft 186 is such that the magnetic clutch always tends to drive the shaft 160 at a speed slightly faster than its most rapid rate of movement. Thus, the cam followers 156 and the mechanism connecting them to the shaft 160 are only required to provide a dragging torque on the shaft 160, working against the magnetic clutch 187 and slowing the shaft 160. The forces applied to the cam groove 155a, 155b, 155c, and to the followers 156 are thereby greatly reduced as compared to the forces which would be required if the over-running magnetic clutch were not provided.

A stripper mechanism is provided for the pin drive wheels 127 and 129. As shown in FIG. 23, this stripper mechanism consists of a single flexible metal strip 301 for each pair of wheels 127 and 129, attached at its right-hand end to a fixed bracket 302 and extending under the drive wheels 127 and 129 and between those wheels and the sheets of paper driven thereby. The strip 301 is slotted under the drive wheels to permit the passage of the pins 128. At its left-hand end, the strip 301 is fastened to a bracket 302a provided with a screw 303 for adjusting the spacing of the strip 301 with respect to the wheel 129, to prevent excessive binding.

Between the side frames of the overlapping unit 5, there extends a shaft 304, located generally above the lifters 130 and having fixed thereon a pair of spring fingers 305 with forked ends 305a. The forked ends span the pins on the pin drive belt 131. The function of the fingers 305 is to engage the upper surfaces of the leading margins of the sheets as they reach a position just to the left of that shown in FIG. 30 and force them downwardly into positive engagement with the preceding sheets, as shown in FIG. 31. The shaft 304 is rotatable by means of a crank (not shown) so that the fingers 305 may be lifted to allow removal of a sheet.

BONDING UNIT—FIGS. 32–40

The bonding unit 6 diagrammatically shown in FIG. 1 is illustrated in detail in FIGS. 32 to 40. Parts of the unit are also illustrated in FIGS. 18, 19 and 23. The unit 6 comprises a heater section 188, a cooler section 189 and a trip release mechanism generally indicated at 190 and cooperating with the heater section 188.

The bonding unit 6 comprises a pair of fixed side frames 191 (see FIG. 34). Extending between the side frames are a pair of shafts 192 and 193. The shaft 193 carries on ball bearings 193a the pin belt drive wheels 132. The shaft 192 fixedly carries a corresponding pair of pin belt drive wheels 194. Shaft 192 also carries a gear 258 (see FIG. 41) through which it is driven from the main shaft section 200. Each of the shafts 192 and 193 carries a pair of sprockets 195. Over the two pairs of sprockets 195 run a pair of chains 196, which support a plurality of parallel pressure bars 197. As the shafts 192 and 193 rotate, the pin belts 131 move the sheets 1 forwardly. As each overlapped joint between two adjacent sheets moves onto the pin belts 131, one of the pressure bars 197 moves underneath that overlapped joint.

The heater section 188 (FIGS. 32, 34, 35 and 36) is located above the entrance end of the pin belts 131 and extends for somewhat more than half the length of those belts. The heater section is mounted on a frame including two side members 198 which are pivotally supported on a shaft 199. The shaft 199 is driven from a section of the main drive shaft shown at 200 in FIG. 32 through a set of bevel gears 201, a vertical shaft 202, and another set of bevel gears 203. The shaft 199 carries, on each side of the heater section 188, a gear 204 mating with an idler gear 205 journaled in one of the frame members 198 and in turn mating with another gear 206 fixed on a stub shaft 207, also journaled in one of the side frame members 198. Another stub shaft 208 is journaled in each of the side frame members 198 near the entrance end thereof. Each of the stub shafts 207 and 208 carries a sprocket 209. Over the pair of sprockets 209, on each side of the heater section 188, runs a chain 210. The chains 210 insulatingly support between them a plurality of heater bars 211. Each heater bar 211 is provided wtih an electrical pigtail connection 212, extending through a hole in a guide plate 213 (FIGS. 35 and 36) fixed on a rotating shaft 214, and thence through a hollow section of shaft 214 to a terminal 213a connected to one of a pair of slip rings 215. A pair of brushes 216 are mounted on the frame 198 and are connected to any suitable external source of electrical energy. The heater bars 211 are connected in parallel by means of jumpers (not shown). A suitable thermostatic control device may be included in this circuit, for example, at one end of each heater bar, as indicated diagrammatically at 217 in FIG. 34.

The shaft 214 carries a sprocket 218 over which runs a chain 219 cooperating with a sprocket 220 on a shaft 221. The shaft 221 extends through a housing 222 which encloses the slip rings 215 and the terminals 213a. On the back end of shaft 221, there is mounted a sprocket 222 engaged by a chain 223. The chain 223 also runs over a sprocket (not shown) on the shaft 203, and is driven thereby. The gearing of shaft 214 is designed so that it makes one revolution each time the bars 211 make one complete traverse around the path of the chains 210.

The entire heater unit, including its frame members 198, the shafts 207 and 208 and the parts associated therewith, may be pivoted about the shaft 199 and thus moved from the active position shown in FIGS. 32, 37 and 39, upwardly to a retracted position as shown in FIG. 38, in which the heater bars 211 are spaced above the sheets of paper moving through the heater unit. This pivotal movement of the heater unit is controlled by the tripping mechanism 190.

A lever 224 (see FIGS. 18 and 32) is pivoted on the outside of the frame 191 at 225. A spring 226 has one end fixed to the frame 191 and its other end fixed to the lever 224, and biases that lever for movement in a clockwise direction about the pivot 225. The lever 221 carries at its outer end a roller 227 which acts against the under side of the frame 198. The spring 226 thus tends to bias the frame 198 and the whole heater unit 188 upwardly, toward the position illustrated in FIG. 38. The heater 188 is held down against the spring 226 by an overcenter latch mechanism (FIGS. 18, 32, 33, 37 and 38), including a link 228 pivoted at its upper end to an extension 229 of the frame 198, and at its lower end to an arm 230 fixed on a shaft 231. The shaft 231 also carries two lever arms 232a and 232b. Downwardly depending from the left end of lever arm 232b is a swinging latch member 233. A spring 234 connected between latch member 233 and the frame 191 biases the latch member 233 toward the left, as viewed in FIGS. 18, 37 and 38. The force of spring 234 is opposed by another spring 235 connected between the latch member 233 and the armature of a solenoid 236. A link 237 extends downwardly from the right-hand end of the lever arm 232a and has its lower end pivotally connected to a lever 238 (see FIG. 33) pivoted to the frame at one end and carrying at its opposite end a reset pedal 239.

Referring to FIG. 33, there is shown a cam 240 mounted on the main drive shaft 200, and cooperating with a follower 241 to actuate a double armed lever 242. The lever 242 is pivoted to the frame at its center and carries at its opposite end a latch finger 243 adapted to engage a latching projection 233a on the latch member 233.

When the apparatus is operating, the parts are in the positions shown in FIGS. 18, 32, 33 and 37. At that time, the cam 240 is effective to reciprocate the lever 242 and thus move the latching finger 243 vertically between the two positions shown respectively in solid and dotted lines in FIG. 37. The latch member 233 has its shoulder 233a at this time held out of the path of the latching finger 243 by the action of the spring 234 and 235. As long as the apparatus continues in proper operation, the parts remain in these positions, and the heater unit remains latched down, by virtue of the fact that the shaft 231 is at the right of the line between the pivot centers at the ends of the link 228. The latch can be released only by moving the lower end of link 228 to the right.

If for any reason, it is desired to stop the apparatus, the solenoid 236 is energized thereby shifting the latch member 233 from the position of FIG. 37 to the position of FIG. 38, so that its shoulder 233a moves into the path of the latching finger 243. Upon the next downward movement of the finger 243, that finger engages the shoulder 233a and drives the latch member 233 downwardly, thereby rotating the lever 232 about the shaft 231 and releasing the latch by moving the lower end of link 228 to the right of shaft 231, so that it is free to move upwardly. At the same time, this action supplies an upward driving force to the heater 198 through the lever arm 232b, arm 230 and link 228, to assist the spring 226 in moving the heater unit 188 to its upward position shown in FIG. 38.

Mounted on the frame member 244 (FIGS. 37 and 38) is a limit switch diagrammatically indicated at 245 having an actuator 246 extending into the path of the latch member 233 when that member is in its position shown in FIG. 38. The switch 245 is connected to control the operation of the motor 12. When the switch actuator 246 is in the position shown in FIG. 37, the motor is running. When the switch actuator 246 is in the position shown in FIG. 38, the circuit of the motor is interrupted.

The motor circuits are arranged so that in order to shut down the motor the solenoid 236 must first be energized to trip the latch mechanism and drive the heater unit 188 upwardly. That same operation engages the actuator 246 and operates the switch 245 to shut down the motor. It is thus ensured that the paper sheets keep moving through the heater unit 188 until after the heater unit is lifted. The paper sheets are not allowed to stay in contact with the heater bars 211. Possible charring and even burning of the moving sheets is thereby prevented.

Since the tilting of the heater unit 188 takes place around the shaft 199 as an axis, the gears 205 roll on the gears 204 during that tilting movement, but maintain their engagement with both the gears 204 and 206. Hence, the drive of the heater bars 211 is not interrupted during the upward tilting of the heater. When the heater is brought back down again to engage the heater bars 211 with the paper sheets, the heater bars are again properly aligned with the overlapped sections between the successive sheets 1.

The cooler unit 189 includes the shaft 199 and another shaft 247, carrying pairs of sprockets 248 over which run a pair of chains 249, which support a plurality of pressure bars 250. The pressure bars 250 are spaced the same distance apart as the pressure bars 197 on the chains 196. As the web moves from the heater unit 188 to the cooler 189, the heater bars 211 are withdrawn from contact with the web. As the web enters the cooler unit 189, one of the pressure bars 250 comes down and engages each pair of overlapped margins of the sheets in the web, compressing those margins between a pressure bar 250 and a pressure bar 197. This pressure is maintained through the cooler unit 189 and continues to the end of that unit, at which time the pressure bars 250 move upwardly away from the web and the pressure bar 197 move downwardly away from the web.

Above the lower reach of the chain 249, between the sprockets 248, there is provided a guide bar 306 biased by springs 307 to engage the chain 249 thereby holding the pressure bar 250 firmly pressed down into engagement with the overlapped portions of the web.

FIG. 41—PRINTING AND NUMBERING UNIT

The web leaving the cooling unit 189 passes under an idler roller 251 and thence between a printing cylinder 252 and a pressure cylinder 253 in a printing unit schematically indicated at 254. The unit 254 may be a consecutive numbering unit of any suitable type, many of which are well known in the art, and is effective to consecutively number the sheets as they pass through the unit. The printing unit 254 and the cooler unit 189 are driven from the main drive shaft through a cross-shaft 255 carrying a gear 256 which engages with a gear 257 on the shaft of the pressure roller 253 and also with a gear 258 on the shaft 192 in the bonding unit 6. The web passes from the first printing unit 254 to a second printing unit 259 which is adapted to print additional matter, e.g., signatures, on the forms. The printing unit 259 includes a printing cylinder 260 and a pressure cylinder 261 and is driven from the main drive shaft through a cross-shaft 266 carrying a gear 267 which cooperates with a gear 268 on the shaft of the pressure roller 261 and also with a gear 269 on the shaft of a pin belt drive wheel 270, which is effective to advance the web at this point. Upon leaving the printing unit 259, the web 10 passes over another pin belt drive wheel 271.

FIG. 42—PERFORATING AND FOLDING UNIT

These units are provided to perforate the web along the lines indicated at 1e and 1f in FIG. 3 and to fold the web in an accordion fold for shipping. These units are individually old in the art, and their only novelty in connection with the present invention lies in their cooperation with the other units of the apparatus. The perforating unit 8 is shown as including two perforating rollers 272 and 273, each carrying cutters 272a and 273a. One of the rollers 272 provides the line of perforations 1e, while the other provides the line of perforations 1f. The perforating rollers 272 and 273 work against pressure rollers 274 and 275 which are driven from the main drive shaft from the main drive shaft through a cross-shaft 276 carrying a gear 277. Another gear 278 on a shaft 279 transmits driving motion to the pin belt wheel 271. Another gear 280 on a shaft 281 transmits driving motion from the pressure roller 275 to another pin belt drive roller 282 at the exit end of the perforating unit 8. The web 10 passes from the perforating unit 8 through a slack loop generally indicated at 283 and over another pin drive wheel 284 to a folder unit shown as being of a simple gravity type. Any suitable accordion folding mechanism may be used alternatively.

While we have shown and described a preferred embodiment of our invention, other modifications thereof will readily occur to those skilled in the art, and we therefore intend our invention to be limited only by the appended claims.

We claim:
1. Apparatus for overlapping sheets having at least one longitudinal row of guide holes punched therein, comprising:
 (a) first means for advancing sheets edgewise in the direction of the longitudinal rows of guide holes, comprising:
  (1) first pin means for engaging the guide holes;
  (2) pin retracting means for moving the pin means transversely of the path of sheet travel between a retracted position and a guide hole engaging position; and
  (3) drive means for moving the pin means in the direction of sheet travel to drive a sheet engaged thereby positively;
 (b) second means for advancing sheets located to receive sheets from the first sheet advancing means, said second means including second pin means for engaging the guide holes to drive the sheets positively; and
 (c) overlapping means including means effective when the first pin means is in its guide hole engaging position to accelerate the drive means to a speed faster than the second sheet advancing means, so that the leading margin of a sheet driven by the first sheet advancing means overtakes the trailing margin of the preceding sheet.

2. Apparatus as defined in claim 1, including:
 (a) a feeder conveyor for supplying sheets to said first sheet advancing means, said feeder conveyor including belt means operable to support and advance sheets frictionally resting thereon;
 (b) front guide means including stop members movable into position to block a sheet moving along said feeder conveyor in a position with its guide holes aligned with the first pin means;
 (c) means coordinating the front guide means with the pin retracting means so that the pin means is retracted when the front guide means stops a sheet in alignment with the pin means.

3. Apparatus as defined in claim 1, in which said accelerating means comprises:
 (a) a cylindrical cam;
 (b) means for rotating the cylindrical cam on its axis at a speed coordinated with the movement of the second sheet advancing means;
 (c) a cam follower engaging a surface on the periphery of said cylindrical cam and connected to said first sheet advancing means for operating it at a speed varying with respect to the speed of the second sheet advancing means according to the cam contour; and
 (d) said cam having a contour with three phases, which respectively:
  (1) stop the first sheet advancing means while a sheet is brought into alignment with the first pin means and engaged thereby;
  (2) accelerate the first pin means to advance the sheet engaged thereby at a faster rate than the second sheet advancing means so that said sheet overtakes the trailing margin of the sheet being driven by the second sheet advancing means; and
  (3) maintains said sheet driven by the first sheet advancing means moving at the same speed as the sheet driven by the second sheet advancing means so that the sheets may be engaged by a common drive mechanism and held in alignment with each other.

4. Apparatus as defined in claim 3, including overrunning clutch means for supplying torque to said first sheet advancing means so that said follower is effective only to control the speed of the first sheet advancing means and does not supply the entire operating torque thereof.

5. Apparatus for overlapping sheets having guide holes punched therein, comprising:
   (a) first belt conveyors means for supporting said sheets and advancing them one by one;
   (b) second conveyor means for receiving sheets from said first conveyor means, including
      (1) support means along which the sheets may be moved;
      (2) sheet driving means including
         (a) drive members insertable into said guide holes;
         (b) alignment stop means to stop the sheets while the drive members move into guide holes spaced from the leading guide holes;
         (c) means for advancing said drive members according to a schedule including a stop phase during which said drive members may be inserted into the guide holes, followed by an accelerating phase during which the drive members and the sheet engaged thereby are accelerated;
         (d) means coordinated with the advancing means to insert the drive members into the guide holes of a sheet stopped at the alignment stop means and to retract the drive members at a subsequent advanced position of the sheet;
   (c) third conveyor means including pin belts for engaging said sheets before they reach said advanced position; and
   (d) said drive member advancing means being effective during its accelerating phase to cause the leading edge of the sheet engaged by the drive members to overtake the trailing edge of the preceding sheet;
   (e) margin lifter means for engaging the under side of the leading margin of each sheet as it approaches the trailing edge of the preceding sheet so that the leading margin moves above the trailing margin as it overtakes the same, and the sheet margins overlap;
   (f) said third conveyor means engaging the leading holes in the overtaking sheet after the sheets overlap and before the sheets reach said advanced position.

6. Apparatus for forming a continuous web from a plurality of sheets, each having two longitudinal edges and two transverse edges, comprising:
   (a) means for punching in each sheet, two rows of spaced holes along the longitudinal margins of the sheets and located accurately with respect to the sheet edges;
   (b) overlapping means, comprising means for continuously moving said sheets forwardly and including means for accelerating each sheet until the transverse leading margin thereof overlaps the transverse trailing margin of the preceding sheet, with each coated surface of a sheet facing a surface of the overlapping sheet; and
   (c) means for fastening the overlapped margins together.

7. Apparatus for forming a continuous web from a plurality of sheets, each having two longitudinal edges and two transverse edges, comprising:
   (a) means for applying a coating of activatable bonding material along one transverse margin of one surface of each sheet;
   (b) means for advancing the marginally coated sheets edgewise successively in a direction parallel to their longitudinal edges;
   (c) overlapping means, comprising means for continuously moving said sheets forwardly and including means for accelerating each sheet until the transverse leading margin thereof overlaps the transverse trailing margin of the preceding sheet, with each coated surface of a sheet facing a surface of the overlapping sheet; and
   (d) means to activate the bonding material while pressing said overlapping margins into firm engagement to bond said sheets together into a continuous web.

8. Apparatus as defined in claim 7, in which:
   (a) said bonding material is heat-activatable; and
   (b) said activating means includes means for heating the overlapping margins while pressing them into firm engagement.

9. Apparatus for forming a continuous web from a plurality of sheets, each having two longitudinal edges and two transverse edges, comprising:
   (a) means for applying a coating of activatable bonding material along one transverse margin of one surface of each sheet;
   (b) means for advancing the marginally coated sheets edgewise successively in a direction parallel to their longitudinal edges;
   (c) means for punching, in each sheet, two rows of spaced holes along the longitudinal margins of the sheet and located accurately with respect to the sheet edges;
   (d) overlapping means, comprising means for continuously moving said sheets forwardly and including means for accelerating each sheet until the transverse leading margin therof overlaps the transverse trailing margin of the preceding sheet, with each coated surface of a sheet facing a surface of the overlapping sheet;
   (e) means to activate the bonding material while pressing said overlapping margins into firm engagement to bond said sheets together into a continuous web, including means for continuously moving the overlapped sheets.

10. Apparatus for making a marginally punched continuous web of consecutively numbered forms, printed on individual sheets, each sheet having two longitudinal edges and two transverse edges, said apparatus comprising:
   (a) means for applying a coating of activatable bonding material along one transverse margin of one surface of each printed sheet;
   (b) means for punching in each sheet, at intervals spaced along the longitudinal margins thereof, holes located accurately with respect to the sheet edges;
   (c) conveyor means for successively advancing the coated and punched sheets;
   (d) overlapping means, comprising means for continuously moving said sheets forwardly and including means for receiving the sheets from the conveyor means and accelerating each sheet until the transverse leading margin thereof overlaps the transverse trailing margin of the preceding sheet, with each coated surface of a sheet facing a surface of the overlapping sheet;
   (e) means to activate the bonding material while pressing said overlapping margins into firm engagement to bond said sheets together into a continuous web, and
   (f) printing means, including means engaging the spaced holes along the longitudinal margins in said printed sheets, for consecutively numbering the sheets in the continuous web in registry with the original printing thereon.

11. Apparatus for making a continuous web from a plurality of separate sheets, comprising:
   (a) means for successively feeding separate sheets having a coating of activatable bonding material along one margin of one surface thereof;

(b) overlapping means, comprising means for continuously moving said sheets forwardly and including means for receiving sheets from the feeding means for accelerating each sheet until its leading transverse margin overlaps the trailing transverse margin of the preceding sheet with the coated margin of each sheet facing a margin of another sheet;

(c) conveyor means for advancing the overlapped sheets from the overlapping means;

(d) activator means moving with the conveyor means for activating the bonding material between each pair of facing margins to bond the sheets together into a continuous web;

(e) means for driving the feeding means, the overlapping means, the conveyor means, and the activator means; and (f) control means for the driving means including means selectively operable either to drive all said means synchronously or to drive the feeding means while all the other means remain stationary.

12. Apparatus as defined in claim 11, in which:

(a) said driving means includes a motor, means connecting the motor to the feeding means, single-tooth clutch means connecting said motor to the overlapping means, the conveyor means and the activator means; and (b) said control means includes means operable to engage and disengage said clutch means, said clutch means being engageable in only one phase relationship between the feeding means and all the other means.

References Cited

UNITED STATES PATENTS

| 2,288,360 | 6/1942 | Jensen | 156—558 |
| 2,640,695 | 6/1953 | Nelson | 270—58 |

DOUGLAS J. DRUMMOND, Primary Examiner

U.S. Cl. X.R.

156—513; 270—58